United States Patent
Vänskä et al.

(10) Patent No.: US 7,017,047 B2
(45) Date of Patent: Mar. 21, 2006

(54) METHOD FOR EVALUATING A PROFILE FOR RISK AND/OR REWARD

(75) Inventors: Marko Vänskä, Espoo (FI); Ian Nordman, Sipoo (FI); Matti Takala, Helsinki (FI)

(73) Assignee: Nokia Corporation, Espoo (FI)

( * ) Notice: Subject to any disclaimer, the term of this patent is extended or adjusted under 35 U.S.C. 154(b) by 16 days.

(21) Appl. No.: 10/290,344

(22) Filed: Nov. 8, 2002

(65) Prior Publication Data

US 2004/0093224 A1    May 13, 2004

(51) Int. Cl.
*G06F 12/14*    (2006.01)

(52) U.S. Cl. .................. 713/193; 713/165; 713/166; 713/167; 705/64

(58) Field of Classification Search .............. 713/193, 713/150, 154, 160, 165, 166, 167, 201; 705/51, 705/54, 58, 64, 67, 76; 726/6
See application file for complete search history.

(56) References Cited

U.S. PATENT DOCUMENTS

| | | | | |
|---|---|---|---|---|
| 5,884,272 A | * | 3/1999 | Walker et al. | 705/1 |
| 6,005,939 A | * | 12/1999 | Fortenberry et al. | 705/76 |
| 6,006,228 A | * | 12/1999 | McCollum et al. | 707/9 |
| 2002/0104015 A1 | * | 8/2002 | Barzilai et al. | 713/201 |

* cited by examiner

*Primary Examiner*—Justin T. Darrow
(74) *Attorney, Agent, or Firm*—Morgan & Finnegan, LLP

(57) ABSTRACT

A method and system are provided to evaluate a privacy indication of a request for one or more data items of user information by a requesting party based on at least one privacy attribute of one or more of the requested data items; and to provide to the requesting party one or more of the requested data items according to the evaluated privacy indication.

55 Claims, 15 Drawing Sheets

USER DEVICE 102

BROWSER

DATA ITEM(S) REQUESTED:   ANALYSIS

| ITEM | REQUIRED | OPTIONAL | IDENTIFIED | NON-IDENTIFIED |
|---|---|---|---|---|
| NAME | X | | X | |
| ADDRESS | | X | X | |
| PHONE NO. | X | | X | |
| PURCHASES | | X | X | |
| LOYALTY# | | X | X | |
| EMAIL | | X | | |
| *OCCUPATION* | | *X* | | *X* |

REQUESTER: KNOWN (HISTORY OF PRIOR TRANSACTIONS)
PURPOSE: COMMERCIAL

DEL ADD    ADD VAL
☐☐☐☐☐☐   ☐☐☐☐☐☐☐
☐☐☐☐☐☐   ☐☐☐☐☐☐☐
☐☐☐☐☐☐   ☐☐☐☐☐☐☐

( CONTINUE )
( CANCEL )

502 — (table area)
504 — INPUT DEVICE(S)   OTHER OUTPUT DEVICE(S)
506 — (controls area)

FIG. 5

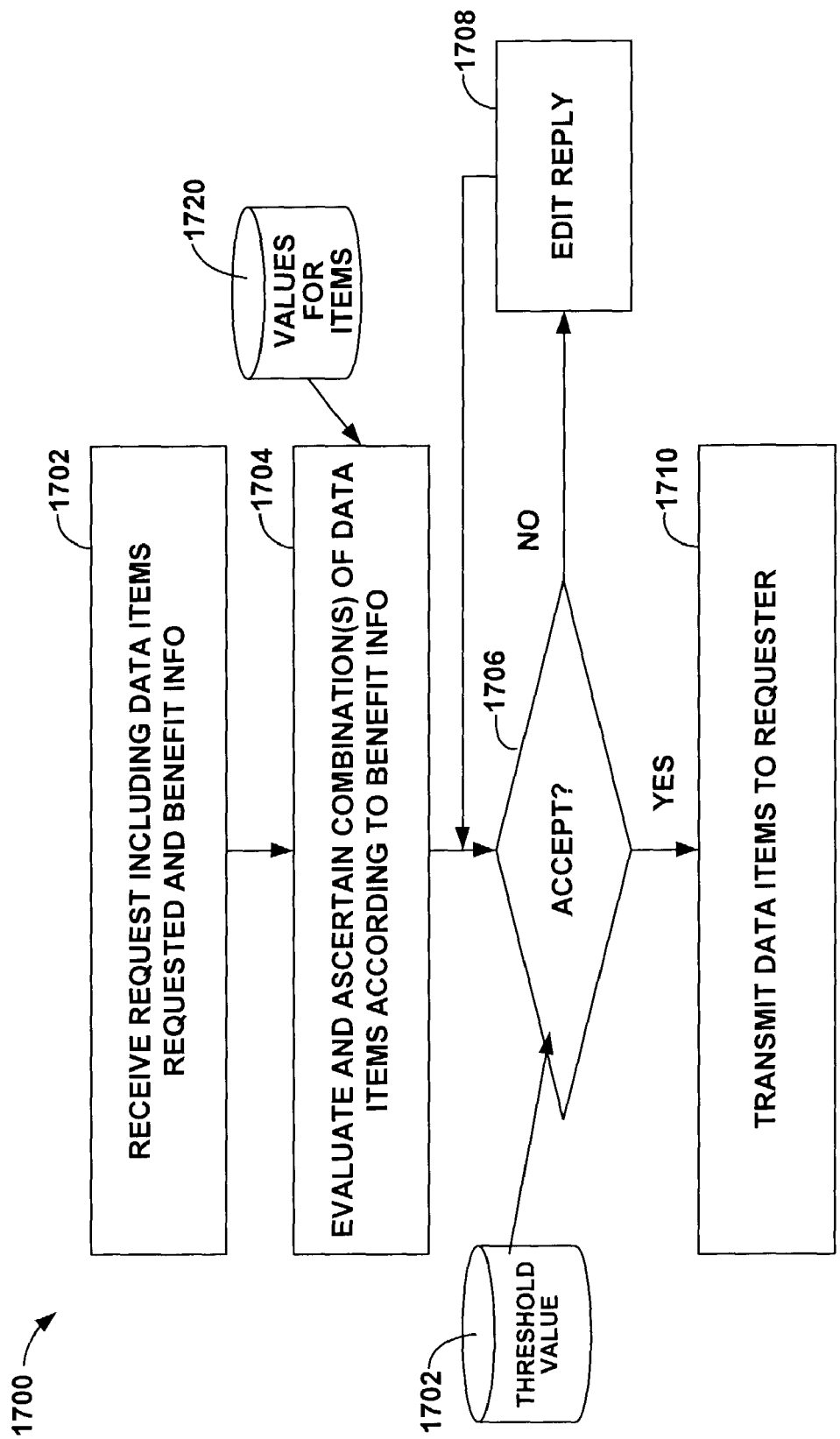

METHOD FOR EVALUATING A PROFILE FOR RISK AND/OR REWARD

BACKGROUND OF THE INVENTION

1. Technical Field

The present invention is related to a method and system for managing user privacy and, more particularly, to a method and system of evaluating privacy risk or reward in the provision of user data.

2. Art Background

Various consumer studies indicate that people have become increasingly concerned about their personal data in a networked environment, such as the Internet. Particularly, people feel that they have lost control over how their information is collected and used, and would like to regain control over their information. For example, once personal information is disclosed to another party, control over that information is relinquished to the receiving party. As such, trust plays a major factor in how much information one party is willing to provide to another.

When a person provides personal details, such as a profile or part of his or her personality profile, it can be considered a risk on his or her privacy. From another vantage point, the person should be rewarded on the completeness or thoroughness of his or her disclosure. It is difficult to assess the privacy risk related to the disclosure of personal information.

SUMMARY

A method, stand-alone or distributed system, and computer program encoded on a memory medium are provided to evaluate a privacy indication of a request for one or more data items of user information by a requesting party based on at least one privacy attribute of one or more of the requested data items, and to provide to the requesting party one or more of the requested data items according to the evaluated privacy indication.

A method, stand-alone or distributed system, and computer program encoded on a memory medium are provided to receive user information including one or more of the requested data items, to evaluate a reward indication for received user information based on at least one reward attribute of one or more of the requested data items, and to provide a reward to the user according to the evaluated reward indication.

BRIEF DESCRIPTION OF THE DRAWINGS

In the drawings, like reference numbers generally indicate identical, functionally similar, and/or structurally similar elements. The drawings in which an element first appears is indicated by the leftmost digit(s) in the reference number.

FIGS. 5 though 12 illustrate various screen shots outputted on the user device.

FIG. 17 illustrates an exemplary process by which combination of data items may be determined and provided to the requester according to benefit information.

DETAILED DESCRIPTION OF THE PREFERRED EMBODIMENTS

Figure 1:
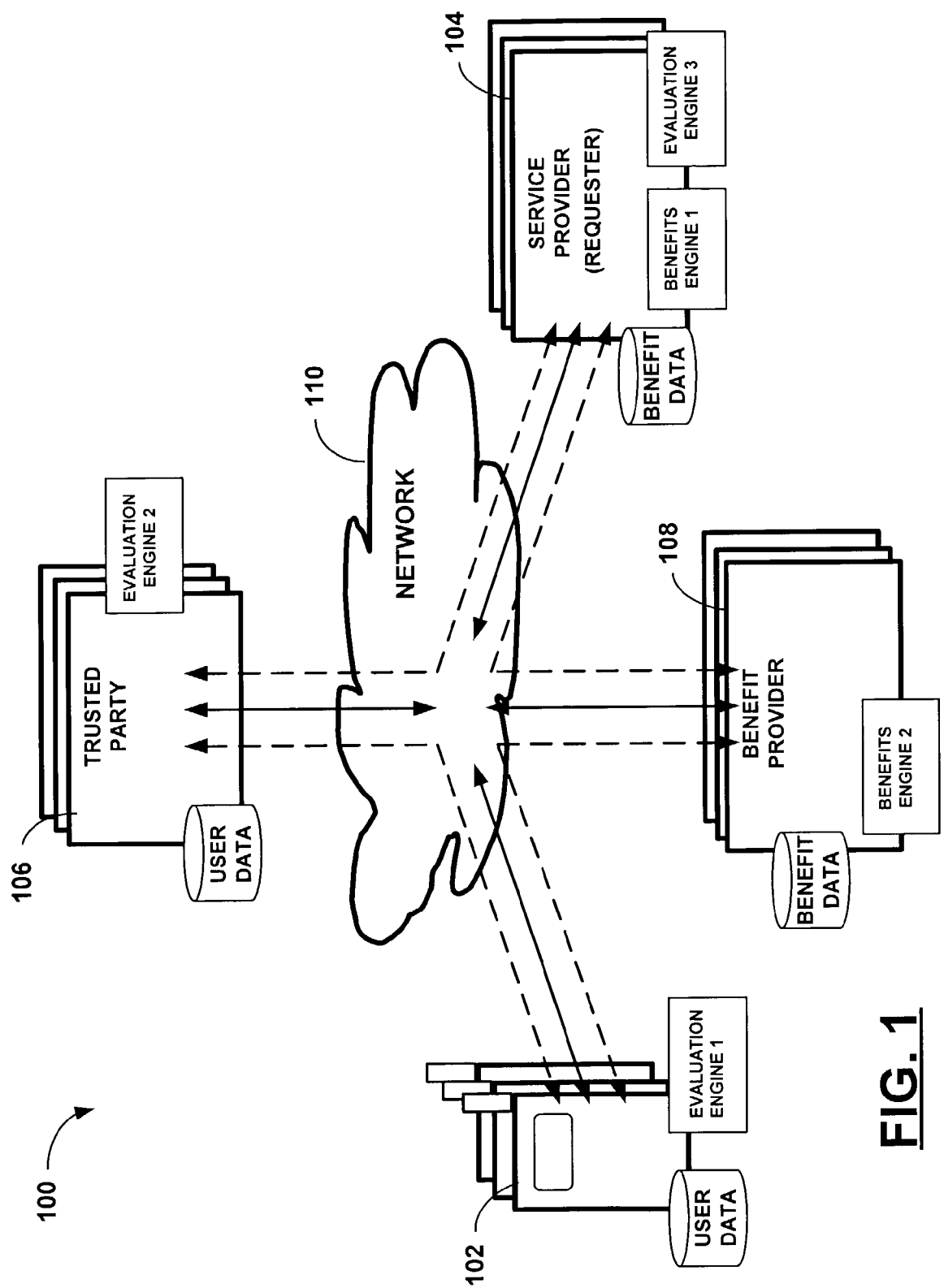
FIG. 1 illustrates an overview of an operational environment performing risk/reward evaluation and service.

FIG. 1 illustrates a general overview of an exemplary network environment 100 in which risk and/or reward or benefit evaluation is performed. Network environment 100 includes a user device 102 operable by a user, a requester 104 (e.g., a service provider), a trusted party 106 and a benefit provider 108, which are able to communicate with each other across a network 110. Network 110 may include a wireless network(s) (e.g., long and/or short range) and/or a wireline network(s), and systems 102, 104, 106 and 108 may employ various wireless and wireline technologies to communicate with each other. Network environment 100 may include plural user devices 102, requesters 104, trusted parties 106 and benefit providers 108.

As shown in FIG. 1, user device 102 may include an evaluation engine 1 (EE1) and user data. User device 102, in combination with the evaluation engine 1 (EE 1), is configured to receive a request for user information from a requesting party, such as requester 104 or trusted party 106, to evaluate a privacy indication (or indicator or index) of the request for one or more data items of user information by the requesting party based on at least one privacy attribute of one or more of the requested data items, and to provide the requesting party with one or more or none of the requested data items according to the evaluated privacy indication.

In one embodiment, user device 102, in combination with evaluation engine 1 (EE1), may be configured to receive a request for user information from requester 104 or trusted party 106; to obtain and identify requested data items of user information and, if desired, a context of the request; to notify the user of the context of the request; to automatically or manually select data items to be evaluated; to compare the requested data items with stored data; to retrieve privacy attributes such as privacy values for identified items; to perform an evaluation of privacy indication for the request; to edit the combination of selected data items evaluated and to make a re-evaluation if necessary or indicated by the user; and to determine whether evaluated privacy indication(s) is acceptable (automatically or manually), and to transmit a response or reply to the requesting party. The notification of context of the request may involve, for example, notification to the user of non-identified requested data items and receipt from the user of additional data (e.g. for non-identified items or data edited by the user).

User device 102 may also be configured to receive rewards or benefits (e.g. coupons) such as from requester 104 or benefit provider 108, to store such rewards or benefits for future or immediate use, to verify possession of the benefits and/or to conduct transaction to redeem the reward or benefit, e.g., to forward such benefit or reward to the party, which accepts the benefits or to employ such reward or benefit in an electronic or in-person transaction.

One or more of the above operations may be performed automatically by user device 102 or may require user input, such as user command, data entry or authorization.

Although each of the above-noted operations may be performed by user device 102, some or all of these operations may be off-loaded to trusted party 106, such as a profile server. As shown in FIG. 1, trusted party 106 may also maintain and manage user data for one or more users and include an evaluation engine, such as evaluation engine 2 (EE2), which operates in a similar fashion to evaluation engine 1 (EE1) discussed above. Trusted party 106, in combination with evaluation engine 2 (EE2), may be configured to perform some or all of the operations discussed above for user device 102, e.g., providing user data to user device 102 or requester 106, evaluating request for user data, storing benefits or rewards, etc.

Trusted party 106 may be given rights to respond to the requester with or without notifying the user. Trusted party 106 may store all or some of the given responses, such as in a service log, so that a user may study afterwards what data has been given. Acquired benefits or rewards may be transmitted directly to the user from requester 104 or benefit provider 108, or may be transmitted to user device 102 through trusted party 106, or may be stored at the trusted party 106.

Evaluation engine 2 (EE2) may employ data item attributes, such as values, which are given by the user or provided or generated by another party, such as trusted party 106. If values other than given or accepted by the user are used in the evaluation, the user may be notified on that preferably before the response is given.

Requester 104 may include an evaluation engine (EE3) which interacts with a request generator, a benefits engine 1 (BE1) and benefits or rewards data. Requester 104, in combination with evaluation engine 3 (EE3), may be configured to receive responses to a request, to check on the degree of completeness of the response, to notify the responder (e.g., user device 102 or trusted party 106) on incompleteness or to request additional data, and to evaluate the response. Evaluation engine 3 (EE 3) may interact with a benefit engine 1 (BE1) at requester 104 or benefit engine 2 (BE2) of benefit provider 108 (e.g., a third party) which may also maintain benefit data. Benefit engine 1 or 2 (BE1 or BE2) may determine and generate rewards and benefits to be provided to a user according to the evaluation of the response or notify the user of such rewards or benefits. The rewards or benefits may be part of a loyalty program, similar to mileage or hotel loyalty programs, or coupons, etc. The result of the evaluation may also be sent to the user.

Further, requester 104 may perform privacy indication evaluations on requested (or to be requested) data items, and provide such evaluations to user device 102 or trusted party 104. The evaluations may be provided along with the request or at other times or upon the user's or trusted party's request.

The risk and rewards processes herein may be implemented in various manners. A few embodiments or variations are discussed briefly below:

[1] User data including one or more data items relating to the user may be stored in whole or in part at user device 102 or trusted party 106. The user or trusted party may associate to some or all of the stored data items attributes, such as a number or a qualifying or quantifying attribute. Such an attribute indicates (or is a measure for) the amount of privacy revealed and may be referred to as a privacy value of the data item.

[2] Different privacy attributes may be combined to obtain a privacy indication or indicator (index) by using computational operations such as summing, weighted summing, or other forms of computational operations to provide some measure relating to privacy. If the attributes are qualifying such as LOW, MEDIUM and HIGH, the privacy indication may be obtained, for example, by counting the number of different attributes, by defining the indication to be the highest privacy attribute of the data items, by counting the number of data items, and so forth.

[3] Different privacy attributes (e.g., privacy values) may be used in different scenarios or contexts, such for different requesting parties, different purposes for the request, and so forth. For example, the data disclosed to official purposes may be valued differently from the data given to commercial purposes. Correspondingly, the data given to friends or to communities of which the user is a member may be given different privacy values. Along similar lines, different thresholds may also be employed for different scenarios or contexts.

[4] The privacy attribute for an item may be dependent on general statistics or other data. For example, the attribute for first or last name can be inversely proportional to the frequency of the first/last name or the combination of them in a country or in a specified geographical area. The frequency may be obtained from official statistics, which may be accessed and maintained by user device 102 or trusted party 106. Correspondingly, the attribute for the street address may reflect the number of inhabitants or dwellings on that street. Other demographic data or available statistics may also be used for setting the privacy attribute of a data item.

[5] Evaluation of privacy indication may employ attributes which are given by the user or those accepted by the user. The attribute accepted by the user may be common to all users of a trusted party 106 or common to a group of users (a community, an association, membership, affiliation).

[6] The evaluation may be performed by user device 102 or another party, such as trusted party 106. Where the valuation is performed by trusted party 106, the user may specify which kind of queries user data may be given and/or may specify the extent to which user data can be given to a requesting party. Further, trusted party 106 may provide the requested data items to a requesting party automatically without informing the user of the request if the user has accepted or set in advance such procedure.

The user may require notification as to any answered requests by trusted party 106, or the user may receive from trusted party 106 a list of all answered requests. The procedure may be different depending on the requesting party (e.g., different procedure for different requesters). If the result of the evaluation is above a set threshold value, trusted party 106 may notify the user, via user device 102, before replying with a denial to the requesting party. Accordingly, trusted party 106 may operate in different ways depending on various conditions and settings in conducting data transactions for one or more users.

[7] In another example, when a request is received from a requesting party, the requested data items (e.g., NAME, ADDRESS, etc.) are identified in the request and the user can evaluate the privacy indication for that request by using a resident program in user device 102 on an item-by-item basis or the evaluation may be performed automatically. The privacy indication may be outputted to the user as different data items are entered, such as on an electronic form or questionnaire, or the user may receive only the final privacy indication.

[8] A request may also be analyzed to ascertain characteristics of requested data items. The characteristic of the request may relate to whether a requested data item is an identified or non-identified data item (e.g., whether the data item is known or has attributes associated therewith). Thus, the user may be informed of non-identified data items or of other characteristics of requested data items (e.g., reward or privacy attributes from the requesting party, etc.). Such non-identified data items may be discarded or left off or provided with an attribute by the user or other systems, such as trusted party 106 or requester 104. Another context may be relate to whether a data item is required (mandatory) or not required (not mandatory). Similarly, this information may also be provided to the user. In such cases, the user may receive notifications, such as "the request cannot be completed without giving the phone number." Further, the evaluation can give as a result both the value for the mandatory items and the value for complete items, as desired.

The characteristics may be determined based on information provided by the requesting party, based on information retained by the user (such as on user service 102 or requester 104), or based on information provided by the user (e.g., the user may define the characteristics).

[9] Various stages in the implementation of the risk or reward processes therein may be performed automatically or may require user input, such as user authorization to proceed or the opportunity for the user to edit the data items to be evaluated or re-evaluated. The user or other party may define such modes of operation. For example, the user may combine values for the privacy indication with actions, such as "If privacy index is smaller than 120, the answer may be given to the requester automatically" or "If privacy index is greater than 180, and the requester is a commercial requester, show the request for editing before responding". Thus, the user may edit the answer even in such cases in which the response is generated automatically either by a program in user device 102 or by trusted party 106.

[10] The data items may be given values or attributes also by the requesting party, such as requester 104, and requester 104 may calculate or evaluate a privacy indication (also referred to in this case as "reward indication"). The valuations for different data items and/or their combinations may be shown to the user. Requester 104 may also combine any data item, a set of data items, and/or the total value of the evaluated privacy indication with discount coupons, loyalty points, or other similar benefits. Requester 104 may disclose to the user in advance the conditions for receiving such benefits (e.g., 100 loyalty point for a disclosed indication of 150, 10 loyalty points for data item #7, 20 loyalty points for data item 5, 6 and 7, and so forth). The benefits may also be evaluated after the user has completed the request. For example, the user may receive a reward and notification of such a reward, e.g., "you are entitled to 5% discount on company A's products.

[11] Data items may be retrieved from stored user data or may be provided by the user (e.g., manually entered by user). For example, the request may be a data form to be filled out by the user, such as a questionnaire, application form, survey form, data requests forms in any electronic transaction, and so forth. Association and input of data for each data item may be performed automatically with user data or may involve user input. For example, the user may fill in the desired portions of the data form, and may be provided at the same time the privacy attributes for at least those data items and/or an evaluated privacy indication for those inputted data items.

Figure 2:
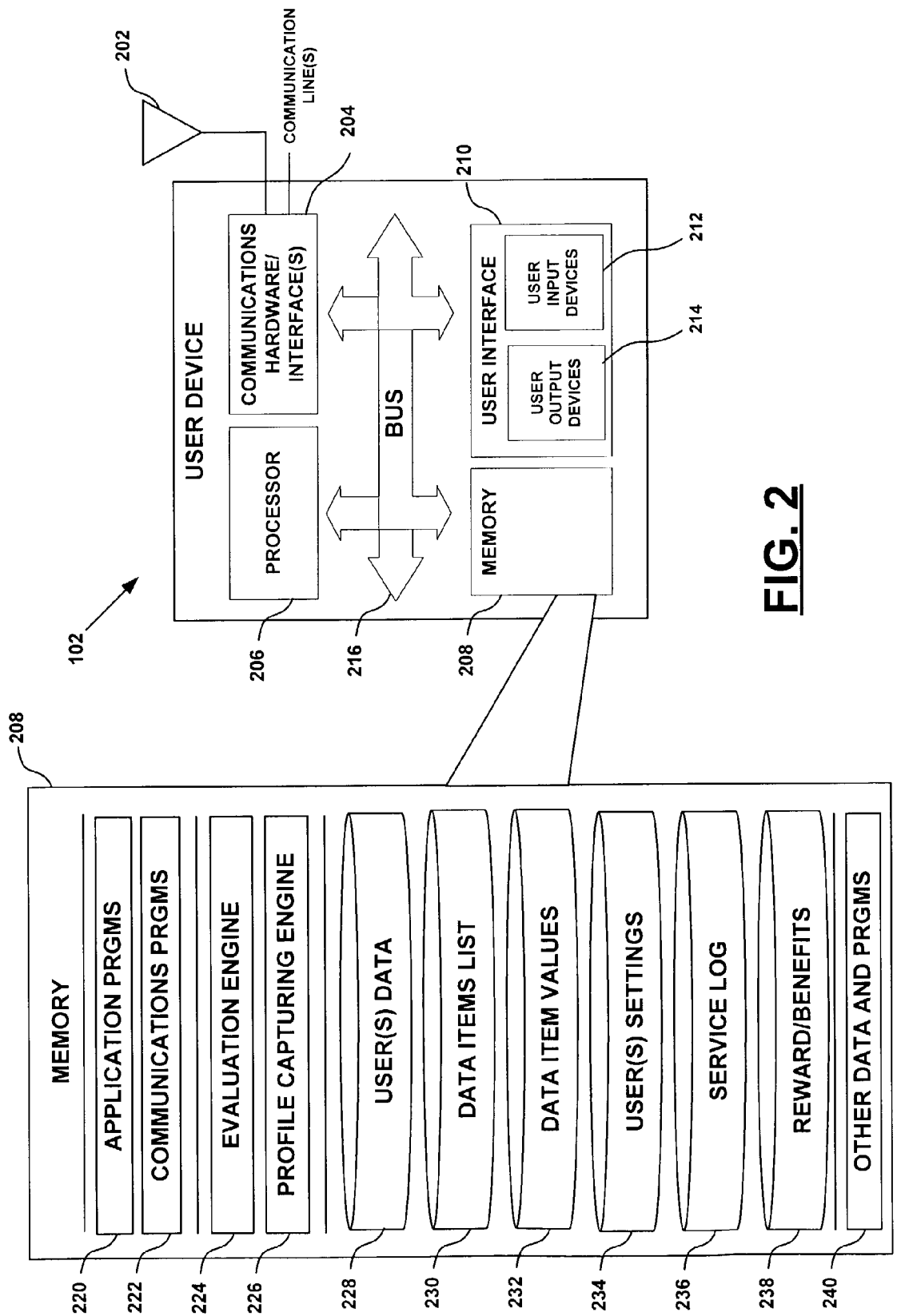
FIG. 2 illustrates a block diagram of an exemplary user device operable by a user.

FIG. 2 illustrates a block diagram of an exemplary user device 102 operable by a user. User device 102 may take the form of a device with wireless and wireline communications capability. For example, user device may be a computer, a personal computer (PC), a portable or laptop computer, a Personal Digital Assistant (PDA), a wireless mobile phone, a pager, a two-way radio, a smartphone, a personal communicator, or other wireless or wireline devices apparent to persons skilled in the relevant arts.

User device 102 may include a processor(s) 206, communications hardware/interfaces for conducting wireless or wireline communications via antenna 202 and communication line(s) respectively, memory 208 and user interface(s) 210. The above components may be coupled according to various techniques. One such technique involves coupling these components through one or more bus interfaces 216. In addition, each of these components is coupled to a power source, such as a removable and rechargeable battery pack (not shown) or a fixed power source.

Processor 206 is coupled to communications hardware portion 204. Processor 206 controls the functions of device 102. Processor 206 may be implemented with one or more microprocessors that are each capable of executing software instructions stored in memory 208, such as to perform the various processes herein. Alternatively, the processes may be implemented primarily in firmware and/or hardware using, for example, hardware components such as application specific integrated circuits (ASICs). Implementation of a hardware state machine so as to perform the functions described herein will be apparent to persons skilled in the relevant art(s).

User interface 210 is coupled to processor 206. User interface 210 facilitates the exchange of information with a user, and may include user input devices 212 to allow a user to input information and user output devices 214 to allow a user to receive information from device 102. Examples of input devices may include keypads, touch screens, and microphones, and examples of output devices 214 may include a display and one or more audio speakers. Exemplary displays include liquid crystal displays (LCDs), and video displays.

Communications hardware/interfaces 204 may include electronics, such as a transceiver, a diplexer and other components to allow user device 102 to conduct wireless and/or wireline communications. To conduct wireless communications, communications hardware/interfaces may be coupled to an antenna 202 to transmit and receive RF signals or may be coupled to an infra-red detector and emitter or other components for conducting wireless communications. These electronics allow user device 102 to wirelessly engage in bi-directional communications (e.g., RF, infra-red, etc.) with other parties. To conduct wireline communications, communications hardware may include modem, Ethernet cards or the like to conduct wireline communications via the PSTN, digital subscriber line (DSL), ISDN, cable, optical network, or other wireline networks. These and other well known communications hardware/interfaces may be employed to conduct wireless and wireline communications with other parties.

Memory 208 may be a fixed memory or a removable memory media which stores information in the form of data and software components. These software components include instructions that can be executed by processor 206. Various types of software components may be stored in memory 208. For instance, memory 208 may store communications programs 222 which include software components that control the operations of communications hardware/interface(s) 204, software components that implement authentication and encryption (e.g., public key infrastructure (PKI) with public and/or private keys), and software components that control the exchange of information through user interface 210. In addition, memory 208 may store application programs 220 which may store various software components that are associated with user applications, such as games, browser-based programs, email/address book programs, word processing programs or other applications and programs employed in the general operations of device 102.

Memory 208 may further store an evaluation engine 224 which includes software components that allow user device 102 to control provision of user data to other parties and to receive and maintain benefits and rewards, as discussed herein. The various operations of engine 224 are discussed further below with one or more of the flow diagrams. Memory 208 may also store a profile capturing engine 226 which evaluates a user's current and/or past activities and updates user profile data.

Memory 208 may additionally store various data, such as user(s) data 228, data items list 230, data item values or attributes 232, user(s) settings 234, service log 236 and reward/benefits 238. User(s) data 228 may store data for one or more user and may include personal user information, such as a user's profile data. Such profile data may include data items such as family name, first name, street address, mobile phone number, home phone number, gender, age (group), income, memberships, hobbies, purchasing habits, email address, or other information associated with the user.

Data items list 230 may store data identifying known data items or data items having associations to data in user(s) data 228. Data item values or attributes 232 stores one or more privacy quantified or qualified attributes for known data items or combinations of known data items. User(s) settings may store the user's settings, such as those involved in the operation of the risk and reward processes discussed herein. Such settings may include those discussed below with reference to FIG. 11. Service log 236 stores the various activities, such a user transactions which may include data transactions involving the provision of user information to other parties. Such information may include those discussed below with reference to FIG. 12. Rewards/Benefits 238 stores rewards or benefits received by the user, such as loyalty points or the like (e.g., mileage points, etc.), electronic coupons, codes, links or other information for retrieving rewards or benefits, printable image of a reward or benefits (e.g., coupon or the like to be used at a retail store), etc.

Memory 208 may also store other data and programs 240 which may include privacy threshold(s) or the like, or other data and programs, such as an operating system, or other data and programs for implementing the various processes and operations discussed herein.

In some embodiments, user device 102 may be a wireless communications device, such as a hand-held device (e.g., PDA, mobile phone, etc.) which employs the Wireless Application Protocol (WAP). When engaging in WAP communications with other systems, the user device functions as a WAP client. To provide this functionality, the user device includes WAP client software, such as WAP Client Version 2.0. WAP Client Version 2.0 is a commercially available software product provided by Nokia Corporation of Finland. WAP Client Version 2.0 contains components, such as a Wireless Markup Language (WML) Browser, a WMLScript engine, a Push Subsystem, and a Wireless Protocol Stack.

Application software components stored in memory, such as memory 308 of the user device with the WAP client software to implement a variety of communications applications. Examples of such communications applications include the reception of Internet-based content, such as headline news, exchange rates, sports results, stock quotes, weather forecasts, multilingual phrase dictionaries, personal online calendars, and online travel and banking services.

A WAP-enabled user device may access small files called decks which are each composed of smaller pages called cards. Cards are small enough to fit into a small display area that is referred to herein as a microbrowser. The small size of the microbrowser and the small file sizes are suitable for accommodating low memory devices and low-bandwidth communications constraints imposed by the wireless portions of communications networks, such as network 106.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript makes minimal demands on memory and processor, such as memory 208 and processor 206 of the user device.

Broadband wireless networks make it possible for WAP-enabled wireless devices to receive content items, such as video and high fidelity audio. Exemplary broadband networks include GPRS, EDGE, WCDMA, and third generation (3G) systems.

The WAP Client includes the wireless Public Key infrastructure (PKI) feature, providing the infrastructure and the procedures required for authentication and digital signatures for servers and mobile clients. Wireless PKI is a certificate-based system that utilizes public/private key pairs associated with each party involved in a mobile transaction. Wireless Identity Module (WIM) is a security token feature of the WAP Client, which includes security features, such as public and private keys and service certificates, needed for user authentication and digital signatures. Additionally, it has the ability to perform cryptographical operations to encrypt and decrypt messages.

Figure 3:
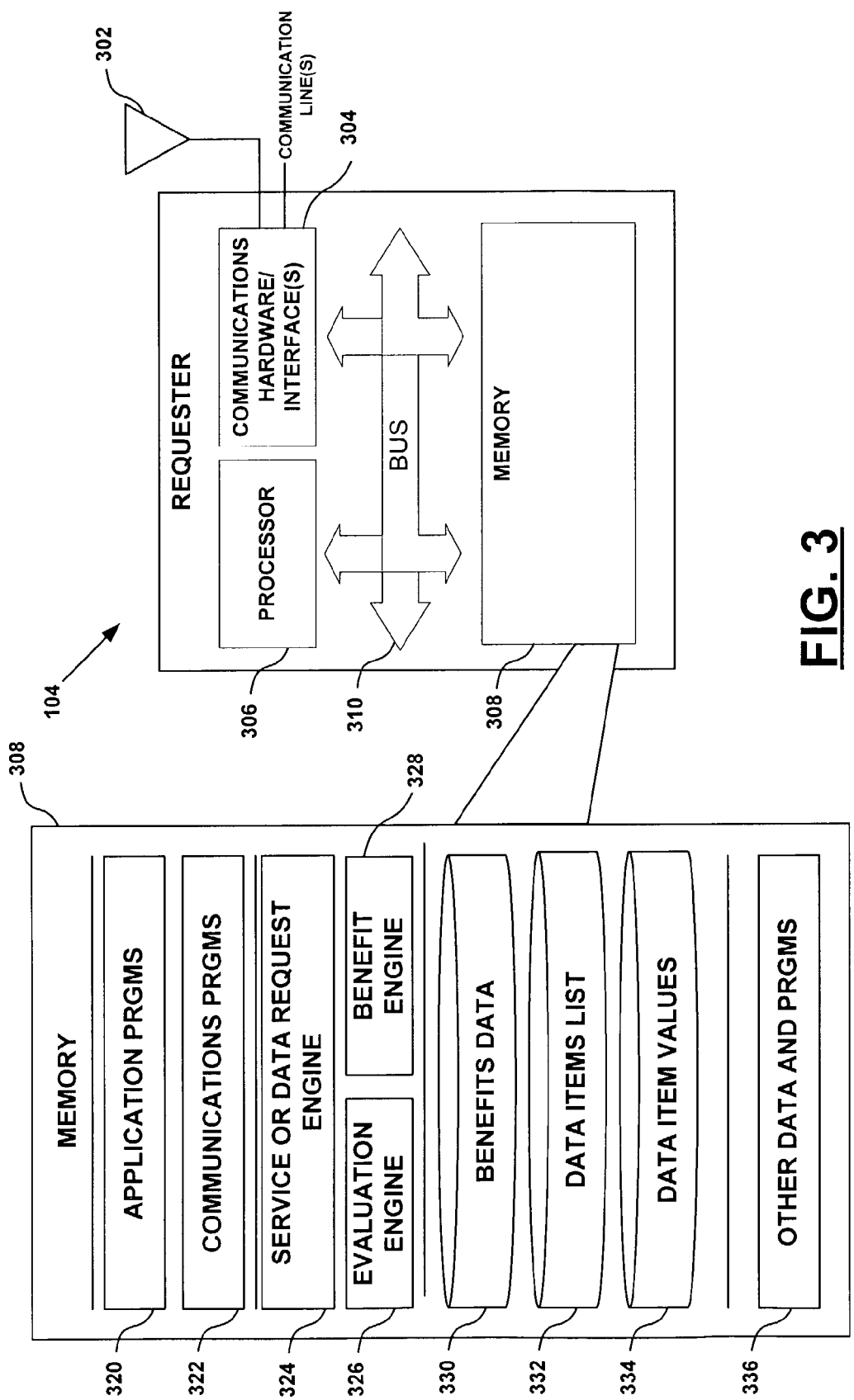
FIG. 3 illustrates a block diagram of an exemplary requester or service provider system.

FIG. 3 illustrates a block diagram of an exemplary requester 104 (or service provider). Requester 104 may take the form of a device with wireless and wireline communications capability, and may be a system operated by a user, such as user device 102 (discussed above), or a server computer system which may be a standalone system or a distributed system including plural computers and storage facilities. Requester 104 may be a service provider or device operated by a user.

Requester 104 may include a processor(s) 306, communications hardware/interfaces 304 for conducting wireless or wireline communications via antenna 302 and communication line(s) respectively and memory 308. Requester 104 may also include user interface(s), such as user interface(s) 210 of FIG. 2. The above components may be coupled according to various techniques. One such technique involves coupling these components through one or more bus interfaces 310. In addition, each of these components is coupled to a power source, such as a removable and rechargeable battery pack (not shown) or a fixed power source.

Processor 306 is coupled to communications hardware portion 304. Processor 306 controls the functions of requester 104. Processor 306 may be implemented with one or more microprocessors that are each capable of executing software instructions stored in memory 308, such as to perform the various processes discussed herein. Alternatively, the processes may be implemented primarily in firmware and/or hardware using, for example, hardware components such as application specific integrated circuits (ASICs). Implementation of a hardware state machine so as to perform the functions described herein will be apparent to persons skilled in the relevant art(s).

Communications hardware/interfaces 304 may include electronics, such as a transceiver, a diplexer and other components to allow requester 104 to conduct wireless and/or wireline communications. To conduct wireless communications, communications hardware/interfaces may be coupled to an antenna 302 to transmit and receive RF signals or may be coupled to an infra-red detector and emitter or other components for conducting wireless communications. These electronics allow requester 104 to wirelessly engage in bi-directional communications (e.g., RF, infra-red, etc.) with other parties. To conduct wireline communications, communications hardware may include modem, Ethernet cards or the like to conduct wireline communications via the PSTN, digital subscriber line (DSL), ISDN, cable, optical network, or other wireline networks. These and other well known communications hardware/interfaces may be employed to conduct wireless and wireline communications with other parties.

Memory 308 may be a fixed memory or a removable memory media which stores information in the form of data and software components. These software components include instructions that can be executed by processor 306. Various types of software components may be stored in memory 308. For instance, memory 308 may store communications programs 322 which include software components that control the operations of communications hardware/interface(s) 304, software components that implement authentication and encryption (e.g., public key infrastructure (PKI) with public and/or private keys), and software components that control the exchange of information through user interfaces, if any. In addition, memory 308 may store application programs 320 which may store various software components that are associated with user applications, such as games, browser-based programs, email/address book programs, word processing programs or other applications and programs employed in the general operations of requester 104. Application programs 320 may also include server-based programs including programs involved in the operation of web site(s), networked environment, electronic transactions or communications with one or more parties.

Memory 308 may further store a service or data request engine 324 that allows requester 104 to conduct service or other electronic transactions with one or more parties. Such transactions may involve surveying, sales of goods and services, advertising, etc. and may involve generating requests and replies when interacting with one or more parties. Memory 308 may also store an evaluation engine 326 which includes software components that allow requester 104 to evaluate privacy and/or benefit indications or indicators. For instance, evaluation engine 326 allows requester 104 to perform a privacy evaluation which can then be forwarded to the user or to perform a benefit or reward evaluation which is employed by a benefit engine 328 which provides rewards or benefits. The various operations of engines 324, 326 and 328 are discussed further below with reference to one or more of the flow diagrams.

Memory 308 may additionally store various data, such as benefits or rewards data 330, data items list 332 and data item values or attributes 334. Benefits or rewards data 330 may identify various benefits or rewards which can be provided and/or benefit-related data associated with the management of a benefit or reward program, such as relationships between different privacy indications, reward indications or data items and the rewards and benefits to be provided, benefits or rewards transaction log, and so forth. Data items list 332 may store data identifying known data items or data items. Data item values or attributes 334 stores one or more quantified or qualified privacy attributes for data items or combinations of data items.

Memory 308 may also store other data and programs 336 which may include other data and programs, such as an operating system or other data and programs for implementing the various processes and operations discussed herein.

While the above describes an exemplary requester 104, benefit provider 108 may also include the same or similar components and functionalities as the requester as discussed above with reference to FIG. 3.

Figure 4:
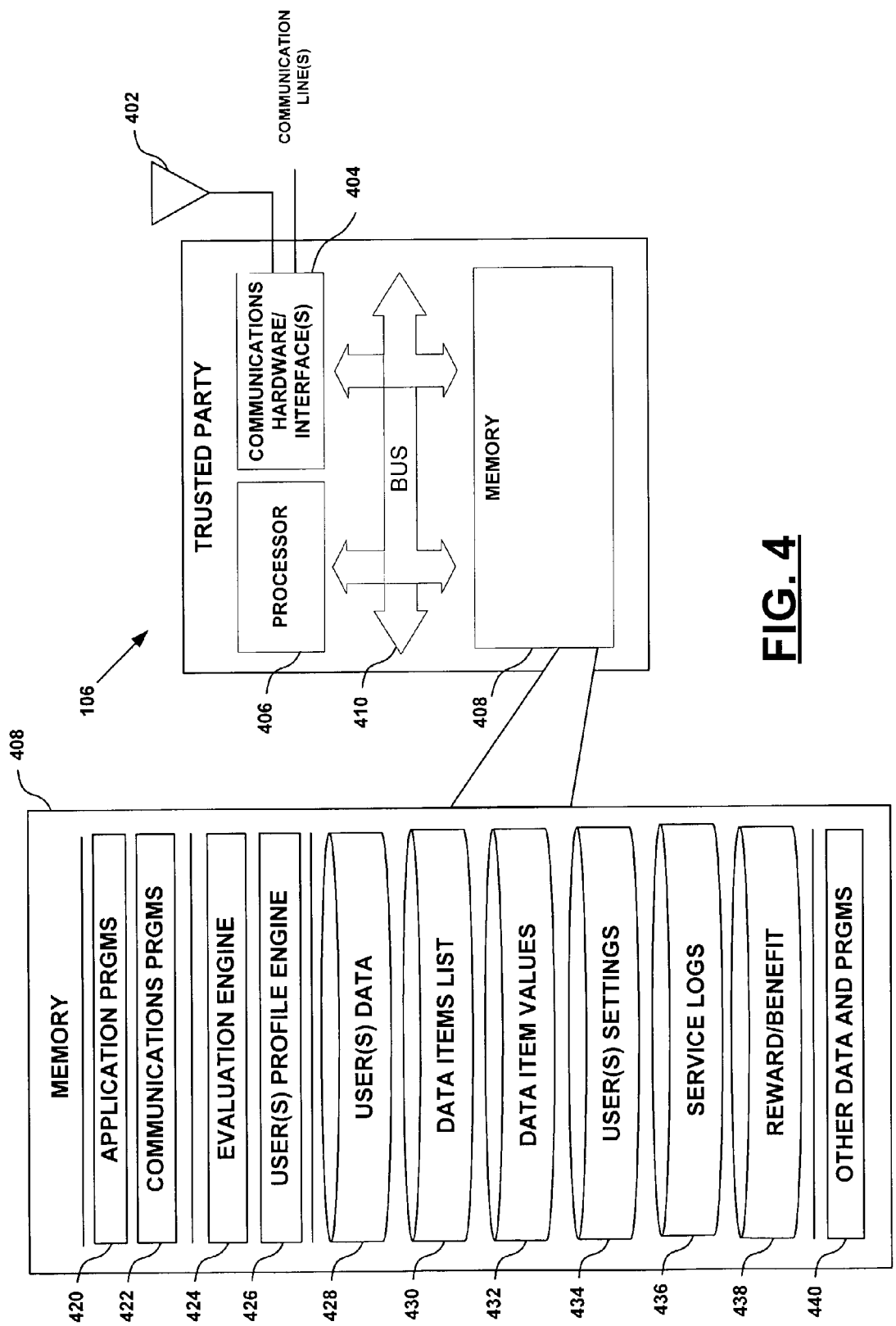
FIG. 4 illustrates a block diagram of an exemplary trusted party or profiler system.

FIG. 4 illustrates a block diagram of an exemplary trusted party 106 (or profile system). Trusted party 106 may take the form of a device with wireless and wireline communications capability, and may be a system operated by a user, such as user device 102 (discussed above), or a server computer system which may be a standalone system or a distributed system including plural computers and storage facilities. Trusted party 106 may be a profile server which manages user profile data or another networked system which interacts with user device 102 to distribute workload and data maintenance therebetween. A benefit of such a distributed system is to reduce the amount of data storage and processing to be performed by the user device, thereby enabling smaller and lower-cost user devices to be employed while retaining or increasing functionality and services to the user.

Trusted party 106 may include a processor(s) 406, communications hardware/interfaces 404 for conducting wireless or wireline communications via antenna 402 and communication line(s) respectively, memory 408 and may include user interface(s), such as user interface(s) 410 of FIG. 2. The above components may be coupled according to various techniques. One such technique involves coupling these components through one or more bus interfaces 410. In addition, each of these components is coupled to a power source, such as a removable and rechargeable battery pack (not shown) or a fixed power source.

Processor 406 is coupled to communications hardware portion 404. Processor 406 controls the functions of trusted party 106. Processor 406 may be implemented with one or more microprocessors that are each capable of executing software instructions stored in memory 408, such as to perform the various processes discussed herein. Alternatively, the processes may be implemented primarily in firmware and/or hardware using, for example, hardware components such as application specific integrated circuits (ASICs). Implementation of a hardware state machine so as to perform the functions described herein will be apparent to persons skilled in the relevant art(s).

Communications hardware/interfaces 404 may include electronics, such as a transceiver, a diplexer and other components to allow trusted party 106 to conduct wireless and/or wireline communications. To conduct wireless communications, communications hardware/interfaces may be coupled to an antenna 402 to transmit and receive RF signals or may be coupled to an infra-red detector and emitter or other components for conducting wireless communications. These electronics allow trusted party 106 to wirelessly engage in bi-directional communications (e.g., RF, infra-red, etc.) with other parties. To conduct wireline communications, communications hardware may include modem, Ethernet cards or the like to conduct wireline communications via the PSTN, digital subscriber line (DSL), ISDN, cable, optical network, or other wireline networks. These and other well known communications hardware/interfaces may be employed to conduct wireless and wireline communications with other parties.

Memory 408 may be a fixed memory or a removable memory media which stores information in the form of data and software components. These software components include instructions that can be executed by processor 406. Various types of software components may be stored in memory 408. For instance, memory 408 may store communications programs 422 which include software components that control the operations of communications hardware/interface(s) 404, software components that implement authentication and encryption (e.g., public key infrastructure (PKI) with public and/or private keys), and software components that control the exchange of information through user interfaces, if any. In addition, memory 408 may store application programs 420 which may store various software components that are associated with user applications, such as games, browser-based programs, email/address book programs, word processing programs or other applications and programs employed in the general operations of device 102. Application programs 420 may also include server-based programs including programs involved in the operation of web site(s), networked environment, electronic transactions or communications with one or more parties.

Memory 408 may further store an evaluation engine 424 which includes software components that allow trusted party and/or user device 102 to control provision of user data to other parties and to receive and maintain benefits and rewards. The various operations of engine 424 are discussed further below with one or more of the flow diagrams. Memory 408 may also store a user profile engine 326 which maintains, manages and updates user data, such as profile data for one or more users and/or user settings associated with user data.

Memory 408 may additionally store various data, such as user(s) data 428, data items list 430, data item values or attributes 432, user(s) settings 434, service logs 436 and reward/benefits 438. User(s) data 428 may store data for one or more user and may include personal user information, such as a user's profile data. Data items list 430 may store data identifying known data items or data items having associations to data in user(s) data 228. Data item values or attributes 432 stores one or more quantified or qualified privacy attributes for data items or combinations of data items.

These attributes may be defined by the user prior to or during data transaction, defined by the trusted party or other parties, or may be default attributes which may be common or standard, such as standard as to trusted party's users or standard to a community of users and requesters, etc. User(s) settings may store the user settings for one or more users. Such settings may be those involved in the operation of the risk and reward processes discussed herein. These settings may include those discussed below with reference to FIG. 11. Service logs 436 store the various activities of one or more users, such a user transaction which may include data transactions involving the provision of user information to other parties. Such information may include those discussed below with reference to FIG. 12. Rewards/Benefits 438 stores rewards or benefits for one or more users. These rewards or benefits may include loyalty points or the like (e.g., mileage points, etc.), electronic coupons, codes, links or other information for retrieving rewards or benefits, printable image of a reward or benefits (e.g., coupon or the like to be used at a retail store), etc.

Memory 408 may also store other data and programs 440 which may include privacy threshold(s) or the like, or other data and programs, such as an operating system, or other data and programs for implementing the various processes and operations discussed herein. The privacy threshold(s) may be customized for one or more users or may be default threshold(s) which are common or standard, such as standard as to trusted party's users or standard to a community of users and requesters, etc.

FIG. 5 illustrates an exemplary screenshot of an output of an analysis result of a request for user information and user interface on a user device. The analysis operations may involve identifying data items and associated characteristics of the data request based on information provided by the requesting party (e.g., information supplied in the data request or additional information requested from the requesting party) and/or data maintained by user device 102 or another system such as trusted party 106. The analysis result may indication one or more or all of the requested data items.

In this example, the output of the analysis result, as shown by reference numeral 502, may indicate the requested data item, such as NAME, ADDRESS, PHONE NO., PURCHASES, LOYALTY NO., EMAIL, OCCUPATION, and associated characteristics of the data items. Such characteristics may include whether a requested data item is required (mandatory) or non-required (non-mandatory) or identified or non-identified. For example, the data item NAME is shown as being a required and identified data item. In contrast, the data item OCCUPATION is shown as being a non-required and non-identified data item. Other characteristics may be identified as desired.

As part of the output, various information may be highlighted or distinguished from other information, as desired, to assist the user. For example, as shown, the requested data item OCCUPATION is highlighted to identify to the user that the particular data item is a non-identified data item. Such highlighting may include employing different fonts and styles, different colors, and so forth.

The output of analysis result may include other information, as shown by reference numeral 504, which relates to a context of the request. Such context information may include an identity of the requester and a purpose of the request. In this example, the requester is a known entity, such as company X, which has a prior history with the user. Prior history with the requester may be discerned from a service log. The purpose of the request in this case is commercial purpose. Generally, any other information relating to the request may be provided to assist the user in selecting desired requested data items to be evaluated.

While not shown, other information such as reliability of the requesting party may also be analyzed and outputted to the user. The reliability may be based on the identity of the requesting party, some certification of the requesting party reflecting its reliability (e.g., such as from a trusted third party certifier) which may be received or requested from the requesting party or certifying party, the user's or other parties prior history with the requesting party.

Figure 16:
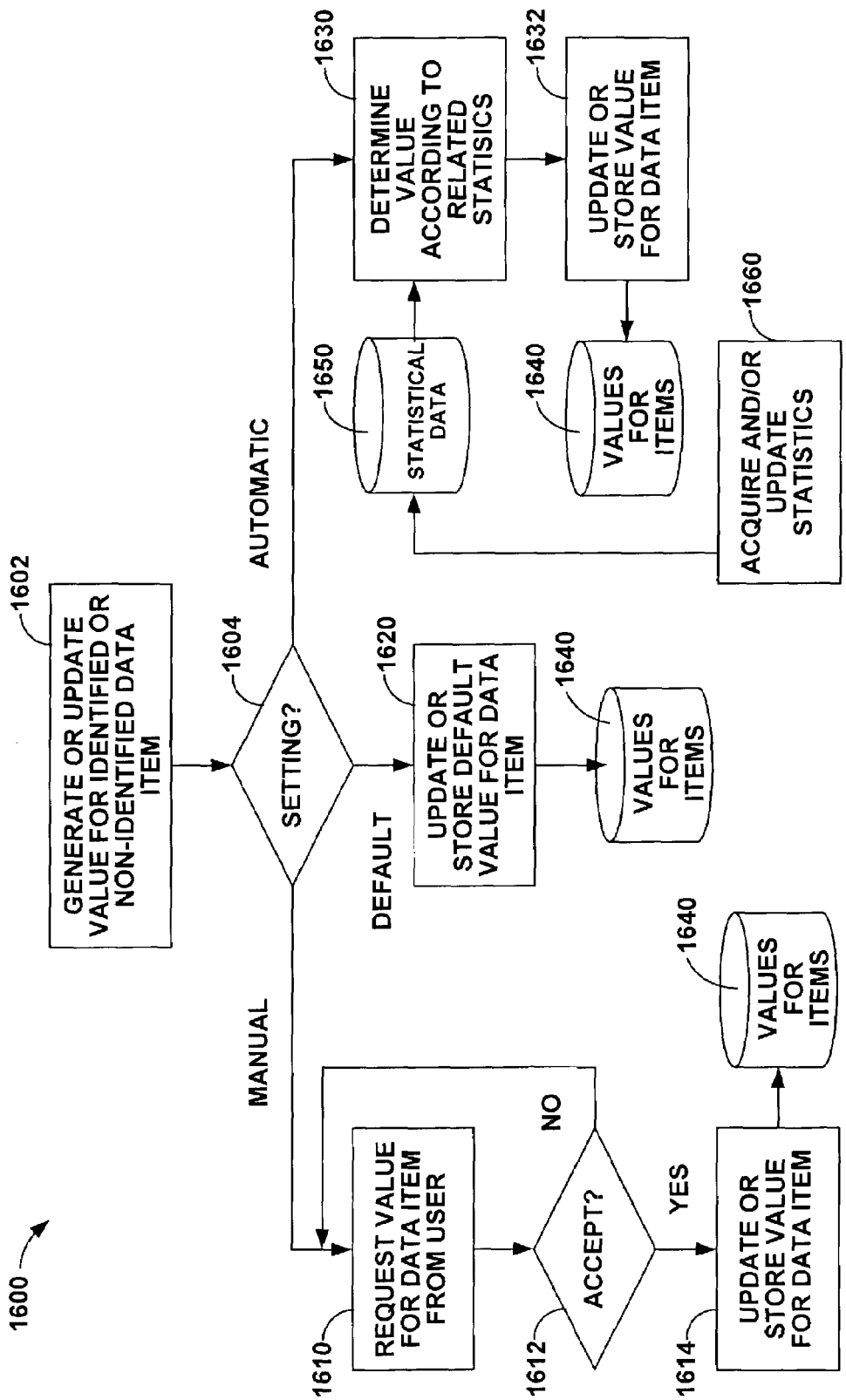
FIG. 16 illustrates an exemplary process by which a privacy value of a data item is generated or modified.

User device 102 may also provide a user interface, such a graphical user interface (GUI) 506, to allow a user to delete or de-select a data item for evaluation, add or select a data item for evaluation, and/or add or modify a privacy attribute for a data item. An exemplary process by which a privacy attribute for a data item is generated or modified is shown in FIG. 16 which is discussed further below. In this example, GUI 506 employs graphical check boxes but may employ other graphical interfaces, such as graphical buttons, pull down boxes or menus, and so forth. Non-graphical input techniques may likewise be employed to receive user commands.

The user may terminate the data request transaction at any time, such as via CANCEL graphical button or other user input, or continue processing of the data request transaction, such as via CONTINUE graphical button or other user input.

Figure 6:
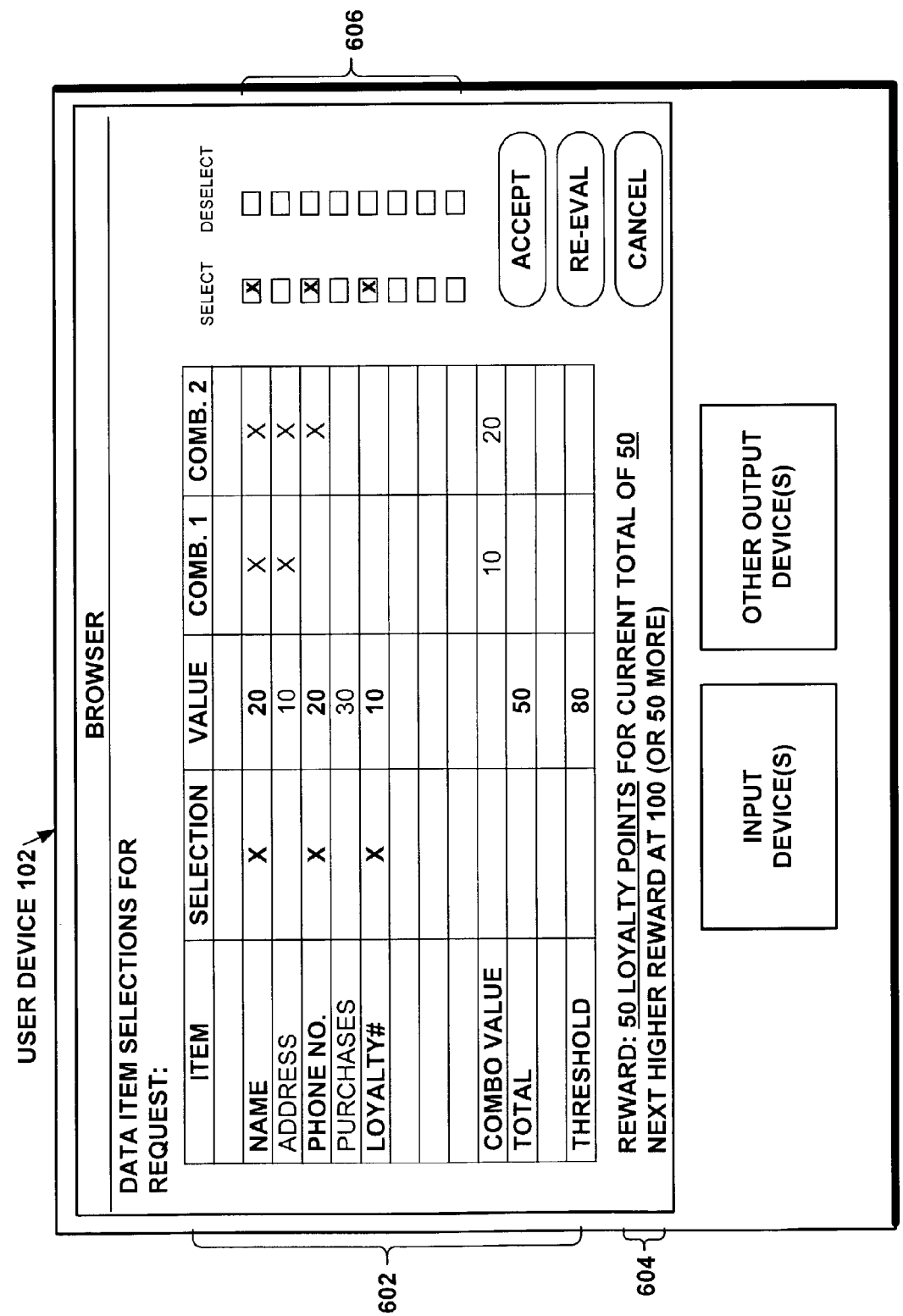

FIG. 6 illustrates an exemplary screenshot of an evaluation result of a request for user information and user interface. The output of the evaluation result, as shown by reference numeral 602, may indicate one or more or each of the requested data items, whether a data item was selected for evaluation, a privacy attribute of a data item (e.g., privacy value), and sub-combinations (e.g., COMB. 1, COMB. 2, etc.) of data items and their privacy attributes (e.g., COMBO VALUE).

As shown, each data item may have associated therewith at least one privacy attribute, e.g., the data item NAME has a privacy value of 20 and the data item ADDRESS has a privacy value of 10. Various sub-combinations of data items may also have associated therewith at least one privacy attribute, e.g., the sub-combination of data items NAME and ADDRESS has an added value of 10. The additional value added by the sub-combinations may reflect how data items when combined reflect a higher privacy concern. Accordingly, if both the data items NAME and ADDRESS are selected, then the sum of the privacy values would be a value of 40 (e.g., Name(20)+Address(10)+Name and Address (10)).

The output of the evaluation result may also include the evaluated privacy indication, such as TOTAL=50, for the combination of selected data items, and the privacy threshold, such as THRESHOLD=80. In this example, the privacy indication or rather the combination of data items satisfies the privacy threshold. The evaluated indicator may be outputted to the user after the evaluation has been completed or as the evaluation proceeds so that the user may obtain the evaluated indicator(s) immediately after any addition or removal of a data item.

As part of the output, various information may be highlighted or distinguished from other information, as desired, to assist the user. For example, as shown, the requested data items NAME, PHONE NO. AND LOYALTY # and their associated data (e.g., VALUE) are highlighted to identify to the user that these particular data items have been selected. Such highlighting may include employing different fonts and styles, different colors, and so forth.

The privacy attributes, in this example VALUES, may be generated and maintained by user device 102, trusted party 106 and/or other party, or such attributes may be provided by the requesting party by request or along with the request for user information. If the values for items are set by the requester, the user may be shown the bonuses for the selection the user has made.

In any event, the user may experiment with different combinations of the requested data items in order to find a combination which provides a balance between the user's privacy interests and potential rewards or benefits from the requesting party.

While FIG. 6 simply shows evaluation results for one combination of selected data items, user device 102 may be configured to output evaluation results for one or more combinations of selected data items, as desired. This would allow the user to compare different combinations of data items and, accordingly, transmit the desired combination (if any) to a requesting party.

The output of the evaluation result, as shown by reference numeral 604, may include benefit or reward information. For instance, the reward or benefit for the current evaluated privacy indication may be identified for the current evaluated privacy indication, e.g., 50 Loyalty Points for a privacy indication of 50. Such benefit and reward information may also identify the new higher reward or benefit and the privacy value commensurate with such benefit or reward. The user may also be informed of the difference in privacy value needed to obtain the next higher reward or benefit. Similarly, benefit or reward information may identify the prior lower benefit or reward, the associated privacy value required, and/or the privacy value difference. The provision of benefit or reward information may further assist the user in determining the data items to be provided to the requesting party.

User device 102 may also provide a user interface, such a graphical user interface (GUI) 606, to allow a user to select or de-select (or remove) a data item to obtain a desired combination of data items for evaluation. In this example, GUI 606 employs graphical check boxes but may employ other graphical interfaces, such as graphical buttons, pull down boxes or menus, and so forth. Non-graphical input techniques may likewise be employed to receive user commands.

The user may terminate the data request transaction at any time, such as via CANCEL graphical button or other user input, or accept the combination of selected data items for transmission to the requesting party, such as via ACCEPT graphical button or other user input, or re-evaluate a combination of selected data items, such as via RE-EVAL graphical button or other user input.

Figure 7:
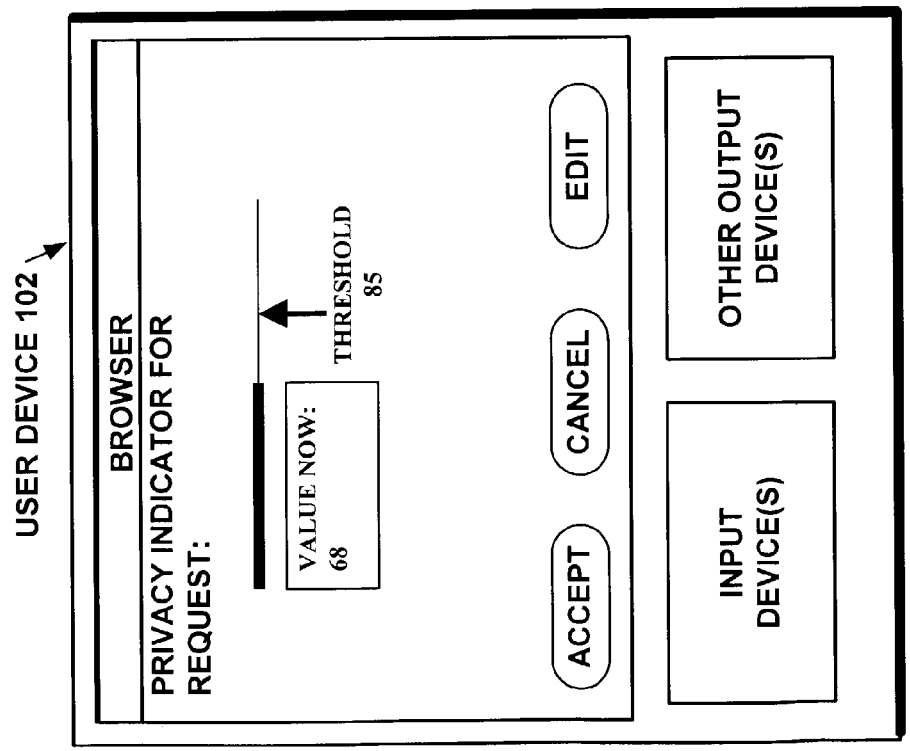

FIG. 7 illustrates another exemplary screenshot of an evaluation result of a request for user information and user interface. In this example, user device 102 outputs the evaluated privacy indication(s) and privacy threshold(s). Instead of or in addition to the output of the privacy indication value (e.g., value of 68) and privacy threshold value (e.g., value of 85), user device 102 may output the evaluation results in a scale form or the like to identify the privacy indication level amount in comparison to a privacy threshold level or amount, as shown.

The user may terminate the data request transaction at any time, such as via CANCEL graphical button or other user input, or accept the combination of selected data items for transmission to the requesting party, such as via ACCEPT graphical button or other user input, or edit and re-evaluate a combination of selected data items, such as via EDIT graphical button or other user input. The selection of EDIT may, for example, bring the user to a screen similar to that in FIGS. 5 and 6 in which the user may edit the selections or make new selections of data items and evaluate them accordingly.

Figure 8:
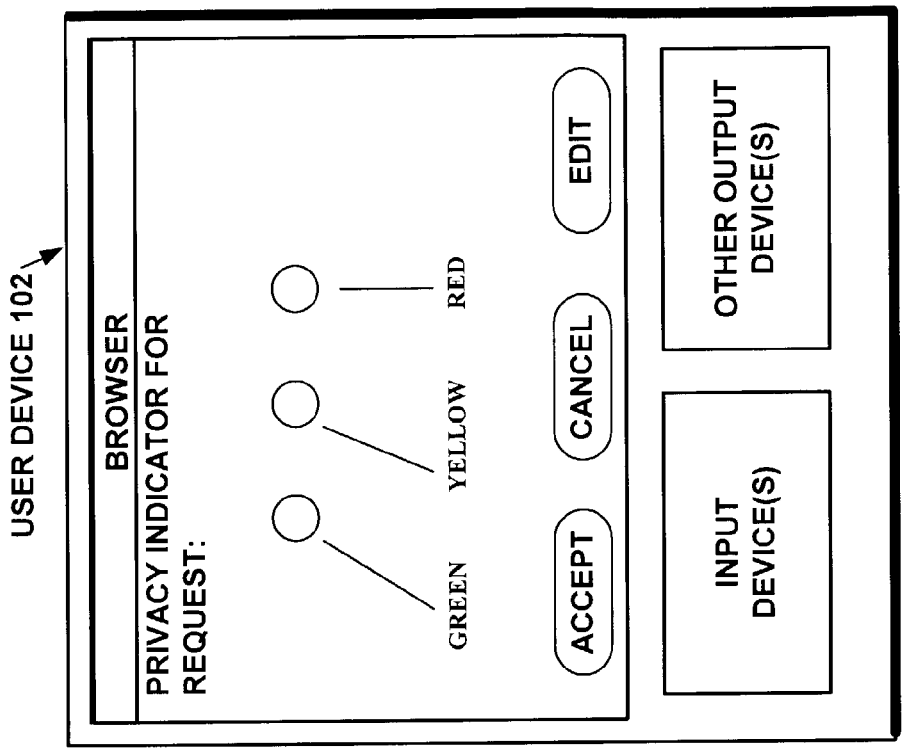

FIG. 8 illustrates a further exemplary screenshot of an evaluation result of a request for user information and user interface. In this example, user device 102 outputs a qualified privacy state or level for the evaluation. As shown, three colors circles are shown having the colors green, yellow and red. Green may stand for a privacy indication below a privacy threshold, yellow may stand for a privacy indication with X % of the threshold, and red stands for a privacy indication above the threshold. Any number of states or levels may be defined and any color or distinguishing visual characteristic may be employed to differentiate between the different levels or states.

Accordingly, privacy indications may be classified to different categories by the user or other parties. The different categories can be shown in different colors or other distinguishing trait so that the user may easily identify the privacy indication, such as prior to transmission of data items to the requesting party.

As with the example of FIG. 7, the user may terminate the data request transaction at any time, such as via CANCEL graphical button or other user input, or accept the combination of selected data items for transmission to the requesting party, such as via ACCEPT graphical button or other user input, or edit and re-evaluate a combination of selected data items, such as via EDIT graphical button or other user input. The selection of EDIT may, for example, bring the user to a screen similar to that in FIGS. 5 and 6 in which the user may edit the selections or make new selections of data items and evaluate them accordingly.

Figure 9:
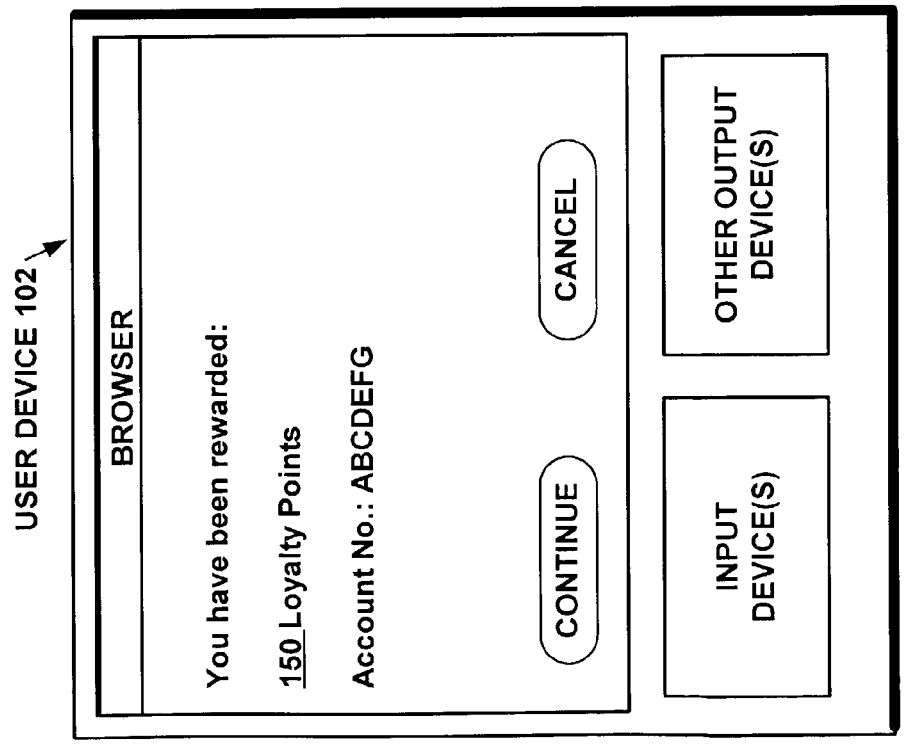

FIG. 9 illustrates an exemplary screenshot of a reward or benefit notification and user interface. As shown, in this example, the user has been awarded 150 loyalty points to his or her account ABCDEFG. Similar to frequent flier programs or the like, these loyalty points may be redeemed for goods and services. The user's loyalty points may be stored or updated in a benefit or reward database, maintained locally or at a remote location such as a trusted party or a network storage facility.

The user may terminate the current transaction or sub-menu at any time, such as via CANCEL graphical button or other user input, or continue with the session with the requesting party, such as via CONTINUE graphical button or other user input.

Figure 10:
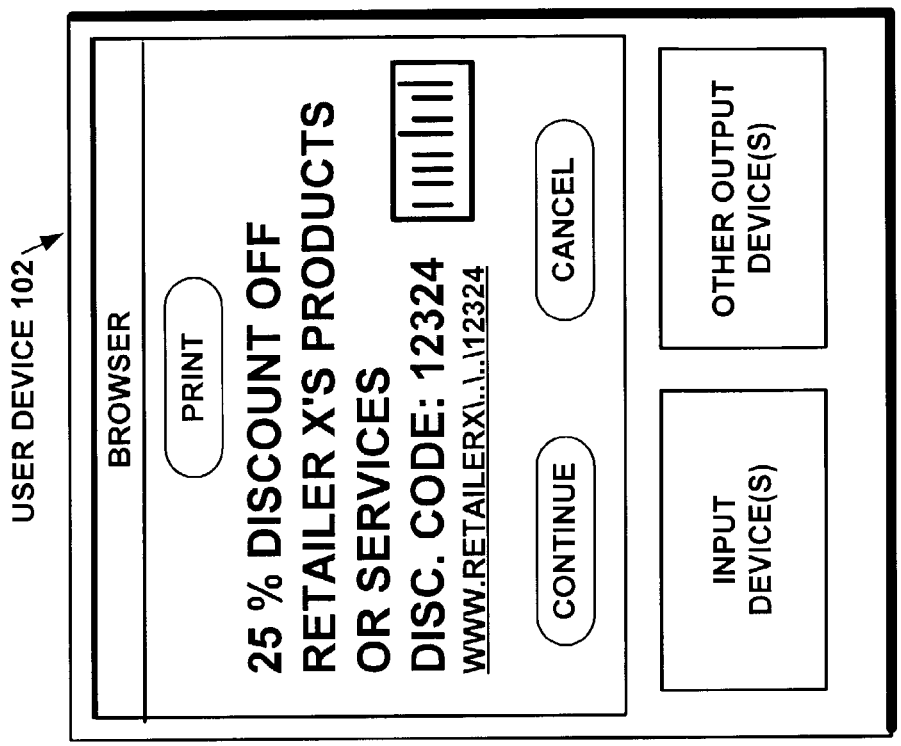

FIG. 10 illustrates a further exemplary screenshot of a reward or benefit notification and user interface. As shown in this example, the user has been awarded a discount of 25% off of retailer X's products or services. This notification may include a discount code, e.g., 12324, which may be employed in electronic transactions to identify the discount, or include a bar code reflecting the discount which may be printed as a paper coupon which can be scanned. The notification may also include a hyperlink to enable the user to conduct a transaction using the discount for a good or service or to enable the user to retrieve the reward or benefit (e.g., discount or free goods or services, etc.).

The user may terminate the current transaction or sub-menu at any time, such as via CANCEL graphical button or other user input, or continue with the session with the requesting party, such as via CONTINUE graphical button or other user input.

Figure 11:
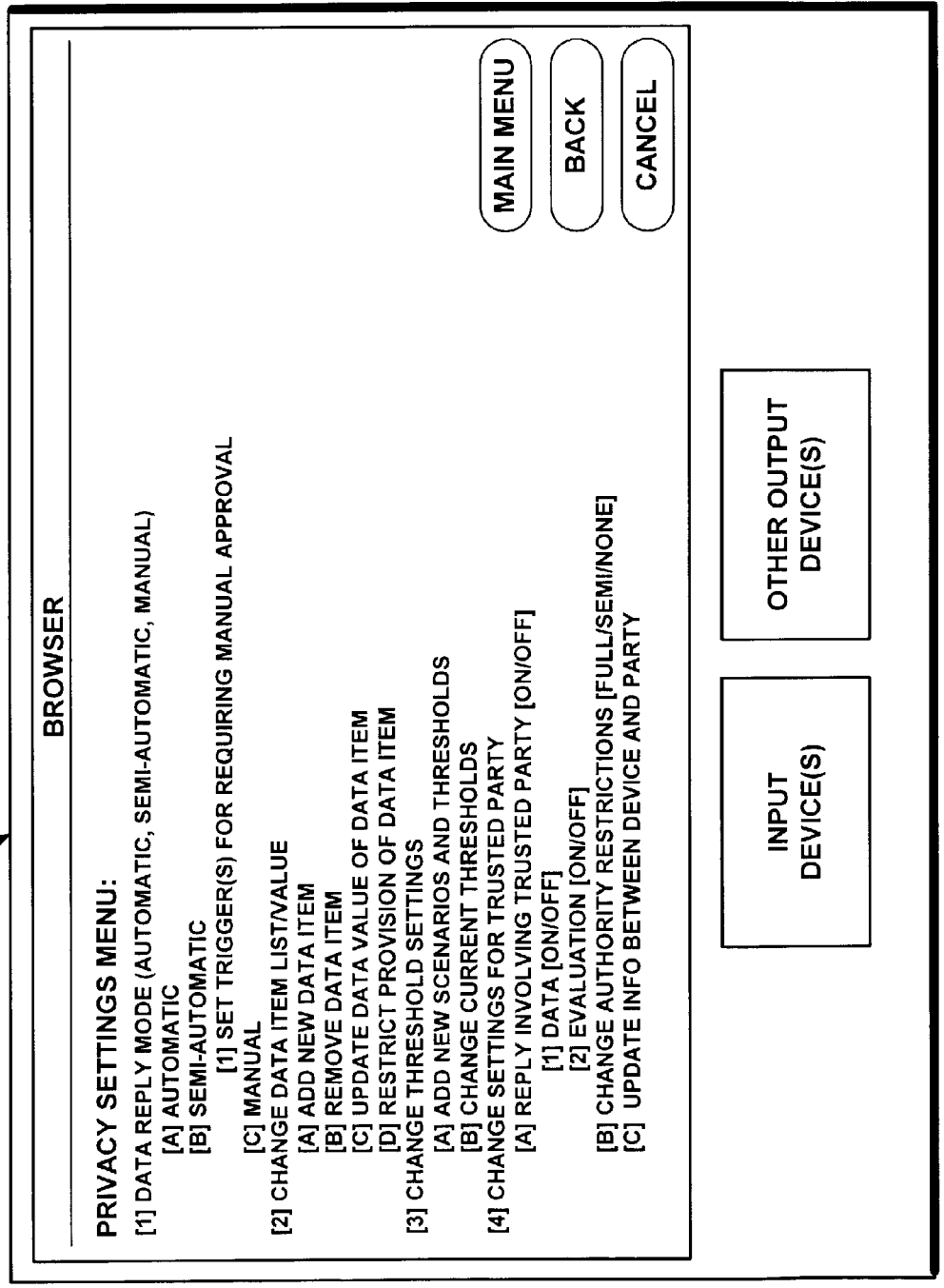

FIG. 11 illustrates an exemplary screenshot of a user privacy setting menu and user interface. In this example, a menu or sub-menus are provided to the user to perform various operations associated with the performance of the risk and reward operations, discussed herein. As shown, the menu may provide the following operations to the user:

[1] DATA REPLY MODE (AUTOMATIC, SEMI-AUTOMATIC, MANUAL)
   [A] AUTOMATIC
   [B] SEMI-AUTOMATIC
      [1] SET TRIGGER(S) FOR REQUIRING MANUAL APPROVAL
   [C] MANUAL
[2] CHANGE DATA ITEM LIST/VALUE
   [A] ADD NEW DATA ITEM
   [B] REMOVE DATA ITEM
   [C] UPDATE DATA VALUE OF DATA ITEM
   [D] RESTRICT PROVISION OF DATA ITEM
[3] CHANGE THRESHOLD SETTINGS
   [A] ADD NEW SCENARIOS AND THRESHOLDS
   [B] CHANGE CURRENT THRESHOLDS
[4] CHANGE SETTINGS FOR TRUSTED THIRD PARTY
   [A] REPLY INVOLVING THIRD PARTY [ON/OFF]
      [1] DATA [ON/OFF]
      [2] EVALUATION [ON/OFF]
   [B] CHANGE AUTHORITY RESTRICTIONS [FULL/SEMI/NONE]
   [C] UPDATE INFO BETWEEN DEVICE AND THIRD PARTY

While the menu is self-explanatory, a brief discussion is provided of the menu items. For example, menu item [1] DATA REPLY MODE allows the user to set the mode of operation for data reply for requests for user information. These modes may include an automatic mode, semi-automatic mode and a manual mode, shown by menu items [1][A] through [1][C]. In the semi-automatic mode, the user may set trigger(s) for identifying when user approval is required in the provision of user data (e.g., X % of the privacy threshold, greater than the privacy threshold, unknown requesting party, general purpose transaction, and so forth).

Menu item [2] CHANGE DATA ITEM LIST/VALUE enables the user to add, remove or modify data items and associated privacy attributes via sub-menus [2][A] through [2][C] and restrict provision of a data item (or combination of data items) via sub-menu [2][D]. For instance, the user may restrict provision of a data item SOCIAL SECURITY NO. or other highly sensitive and private user information. This restriction may be a variable restriction dependent on various factors, such as the context of the request, e.g., the identity of the requesting party and/or purpose of the request and/or reliability of the requesting party.

Menu item [3] CHANGE THRESHOLD SETTING enables the user to add new scenarios and thresholds and change current thresholds, such as via sub-menus [3][A] and [3][B], respectively. The threshold setting may be maintained locally at the user device, or remotely at a trusted party or networked storage facility.

One or more privacy thresholds may be defined according to a particular scenario which may, for example, reflect a context. In one example, the privacy threshold may be dependent on the context of the request, e.g., the identity of the requesting party and/or purpose of the request. The privacy threshold may be higher (or harder to meet) for a known party such as a friend or for official purpose, e.g., privacy threshold=500 or LOW PRIVACY. In contrast, the privacy threshold may be lower (or easier to meet) for an unknown party or general purpose request, e.g., privacy threshold=20 or HIGH PRIVACY.

Menu item [4] CHANGE SETTINGS FOR TRUSTED PARTY enables a user to manage operations and data between user device and trusted part(ies) in the implementation of the risk and reward processes discussed herein. For example, in sub-menu [4][A], the user can set whether the trusted party is to be involved in a request for user information, such as whether the user data (e.g., data items) are to be provided from the trusted party or locally by the user's device or whether evaluation is to be performed by the trusted party or locally by the user's device.

In sub-menu [4][B] CHANGE AUTHORITY RESTRICTIONS, the user can set whether the trusted party has full authority, semi- or partial authority or no authority in the provision of user data to a requesting party. In the full authority setting, the trusted party may respond directly or indirectly (via the user's device) with the requesting party. In the semi- or no authority settings, user authorization or input is sometimes or always required, respectively.

In sub-menu [4][C] UPDATE INFO, the user can initiate update of data between the user's device and the trusted party or set a triggering condition (e.g., periodic, schedule, a change in data, etc.) upon which update is to occur. This data may include data item lists, data item privacy attributes, privacy thresholds, user settings, benefits or rewards data, and so forth. For example, user device 102 may be updated with new data items and/or new default privacy attributes, or trusted party may be updated with changed user settings.

The user may terminate the current transaction or menu at any time, such as via CANCEL graphical button or other user input, return to the main menu, such as via MAIN MENU graphical button or other user input or return to the prior menu, such as via BACK graphical button or other user input.

Figure 12:
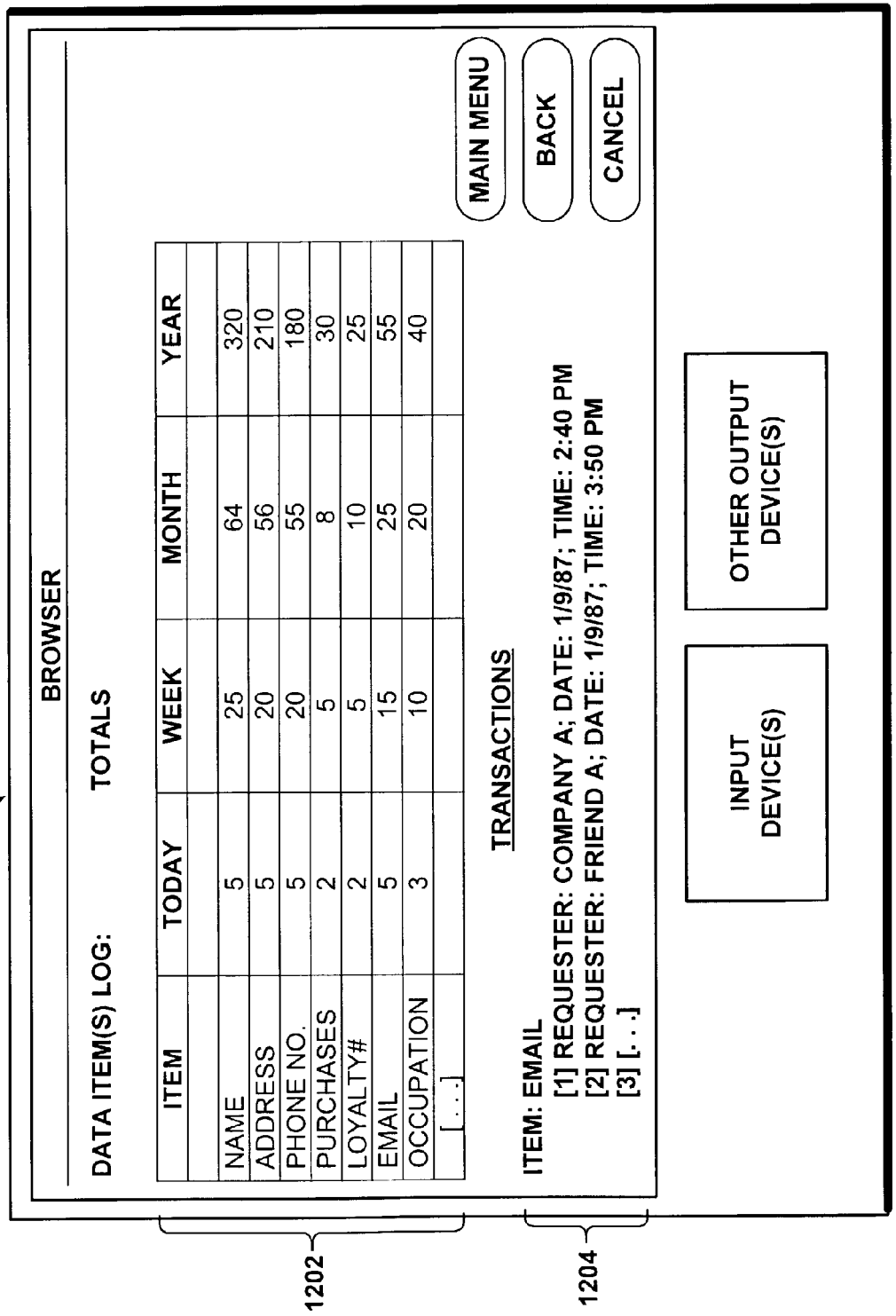

FIG. 12 illustrates an exemplary screenshot of a data item log and user interface. User device 102 may automatically upon a triggering condition (e.g., periodic, schedule, etc.) or at the request of the user generate and output a data item(s) log. As shown by reference numeral 1202, the output may indicate data items and the number of times such items were provided to requesting parties, according to day, week, month year, etc. In this example, the data item NAME has been given out 320 times in a year.

As shown by reference numeral 1204, data transaction information for one or more data items may also be outputted, as desired, and may show the various transactions in which a data item or items were involved as well as various transaction characteristics. In this example, the transaction log for the data item EMAIL has been outputted and identifies the various data transactions, such as by name of requesting party, date and time. Other information may also be maintained and outputted, such as the evaluated privacy indication, the privacy threshold, the purpose of the request, whether the data item was required or mandatory, and/or any other useful information. These or other characteristics may be employed to filter and output desired transaction reports for a data item(s).

The user may terminate the current transaction or operation at any time, such as via CANCEL graphical button or other user input, return to the main menu, such as via MAIN MENU graphical button or other user input or return to the prior menu or operation, such as via BACK graphical button or other user input.

Figure 13:
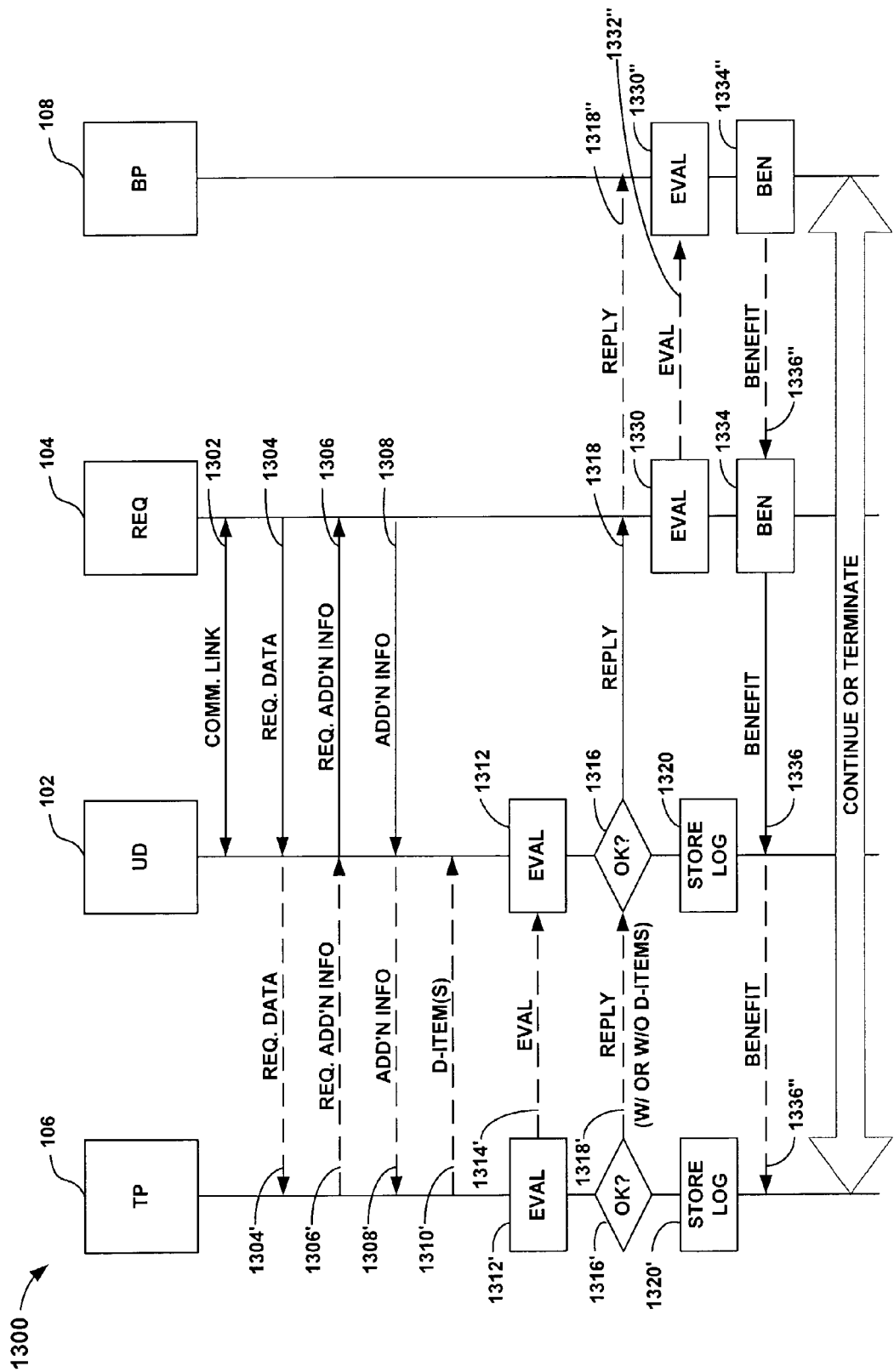
FIG. 13 illustrates an exemplary process by which the user device (UD), the requester (REQ), the trusted party (TP) and the benefit provider (BP) interact with each other.

FIG. 13 illustrates a flow diagram of an exemplary process 1300 by which a request for user information may be evaluated to ascertain a privacy indication or reward indication. The process will be discussed with reference to the devices and systems as shown in FIG. 1, such as trusted party (TP) 106, user device (UD) 102, requester (REQ) 104 and benefit provider (BP) 108. The dotted lines refer to processes which can be off-loaded by user device 102 and requester 104 to another device or system, such as trusted party 106 and benefit provider 108, respectively.

At step 1302, communications is established between user device 102 and requester 104. At step 1304, requester 104 requests user information which includes one or more data items. User device 102 may analyze the request to ascertain various characteristics about the requested information, such as whether one or more of the requested data items are required data items and non-required data items. For example, requester 104 may require data items such as name and address, but not require data items (e.g., optional data items) such as e-mail address, phone number, etc. The characteristic of whether a data item is required or not required may be included by requester 104 as part of the request or may be requested by user device 102. These characteristics of the requested data items may be outputted to the user to assist in the selection and evaluation of the request.

User device 102 may also analyze the request to ascertain characteristics such as whether one or more of the requested data items are identified data items and/or non-identified data items. That is, user device 102 may compare the requested data items to known data items recognized by the user device and determine which requested data items are identified and/or non-identified. These characteristics of the requested data items may be outputted to the user to assist in the selection and evaluation of the request. In the event that a requested data item is a non-identified data item, user device 102 may automatically or upon a user command request additional information from requester 104 at step 1306. At step 1308, requester 104 may provide the additional information requested by user device 102.

At step 1312, user device 102 evaluates a privacy indication for the request according to privacy attributes of one or more of the requested data items. At step 1316, user device 102 analyzes the evaluated privacy indication and, accordingly, replies to requester 104 according to the evaluated privacy indication(s) of the request at step 1318. The evaluation may involve automatic selection by user device or manual selection by the user of combinations of the requested data items to be evaluated, and then performance of an evaluation for the selected combination of requested data items. These operations may be performed multiple times until a satisfactory combination of requested data items are ascertained.

Returning to step 1318, the resulting reply may be the provision of none or one or more data items (e.g., none of the data items, some of the requested data items or all of the data items) depending on the evaluated privacy indication(s). For example, a selected combination of requested data items is not provided to requester 104 if the evaluated privacy indication does not satisfy a predetermined privacy threshold (e.g., a level, a number, a range, etc.). As discussed herein, the privacy attribute, the privacy indication, and privacy threshold may be quantified or qualified.

Thereafter, at step 1320, user device 102 may store the transaction of data items in a log, such as a service log which may identify the identity of the requester, the data items provided, the time and date of the transaction, the privacy indication(s), the privacy threshold as well as the benefit (if received) or other useful information to assist the user in privacy control.

The process continues at requester 104 which receives the reply of step 1318. At step 1330, requester 104 may perform its own evaluation to ascertain a reward indication according to reward attributes of the received data items at step 1330. Alternatively, requester 104 may receive the evaluated privacy indication for the received data items from user device 102 and employ the evaluated privacy indication as the evaluated reward indication. The privacy indication may be forwarded to requester 104 along with the data items of user information. The utilization of the evaluated privacy indication may be particularly useful where standard privacy attributes are associated with data items. For example, the data item NAME may have a standard privacy value of 10.

Such an arrangement would reduce the work load on the requester's side in the provision of benefits.

At step 1334, requester 104 determines a benefit according to the evaluated reward indication and generates an electronic embodiment of the reward or benefit, such as in the form of an electronic certificate (e.g., electronic coupon) or the like. The benefit may be linear or non-linear with the reward indication or data items provided. At step 1336, requester 104 provides the reward or benefit to user device 102 or informs the user of the reward or benefit. The reward or benefit may be stored in user device 102 or other system for future redemption or use thereof. Thereafter, the communications session may continue or terminate between user device 102 and requester 104.

While the various processes are described above as being performed by user device 102 and requester 104, one or more of these processes may be off-loaded and performed by another system such as trusted party 106 and benefit provider 108, respectively. Furthermore, data such as user data or benefit data may also be offloaded to or performed by, in whole or in part, trusted party 106 and benefit provider 108, respectively.

For instance, trusted party 106 may perform one or more of the processes 1302 through 1336 of user device 102 and may communicate directly with requester 104 (or benefit provider 108) or communicate with requester 104 (or benefit provider 108) via user device 102 in the performance of such processes. As shown, trusted party 106 may perform or be involved in steps 1304', 1306', 1308',1312', 1316', 1318', 1320' and 1336' which are similar to corresponding steps 1304, 1306, 1308,1312, 1316, 1318, 1320 and 1336 discussed above for user device 102. In this example, trusted party 106 evaluates privacy indication(s) and provides such to user device 102 at step 1314'.

Furthermore, where user data is maintained or controlled by trusted party 106, the trusted party may provide requested data items to user device 102 at step 1310' prior to any evaluation or at any point during the processes from receipt of a request for user information to provision of one or more requested data items to requester 104. The data items may be provided to the user device 102 upon a request by user device 102 (where the request from the user device is performed automatically or upon a user command) and automatically at any stage after receipt of a request for user information.

User data in general may also be updated between user device 102 and trusted party 106 automatically upon a triggering event, such as periodically, on a schedule, upon a command by the user and so forth. Such user data may include user data items, user service logs and other user-related information.

Similarly, various processes performed by requester 104 may be off-loaded and performed by another system, such as benefit provider 108. For example, benefit provider 108 may perform one or more of the processes 1330 through 1336 of requester 104 and may communicate directly with user device 102 (or trusted party 106) or communicate with requester 104 (or trusted party 106) via requester 104 in the performance of such processes.

As shown, benefit provider 108 may perform or be involved in steps 1318", 1330", 1334" and 1336" which are similar to corresponding steps 1318, 1330, 1334 and 1336 discussed above for requester 104. Benefit provider may perform its own evaluation of reward/privacy indication(s) at step 1330" or may receive evaluated reward/privacy indication(s) at step 1332" and accordingly determine a reward or benefit based on the indication(s).

Furthermore, where benefit data is maintained or controlled by benefit provider 108, the benefit provider may provide benefit information (e.g., benefit list) to requester 104 at any stage during the communications session. The benefit information may be provided to requester 104 upon a request by the requester (where the request from the requester is performed automatically or upon some manual command) and upon a triggering event at any stage before, during or after the data transaction.

Figure 14:
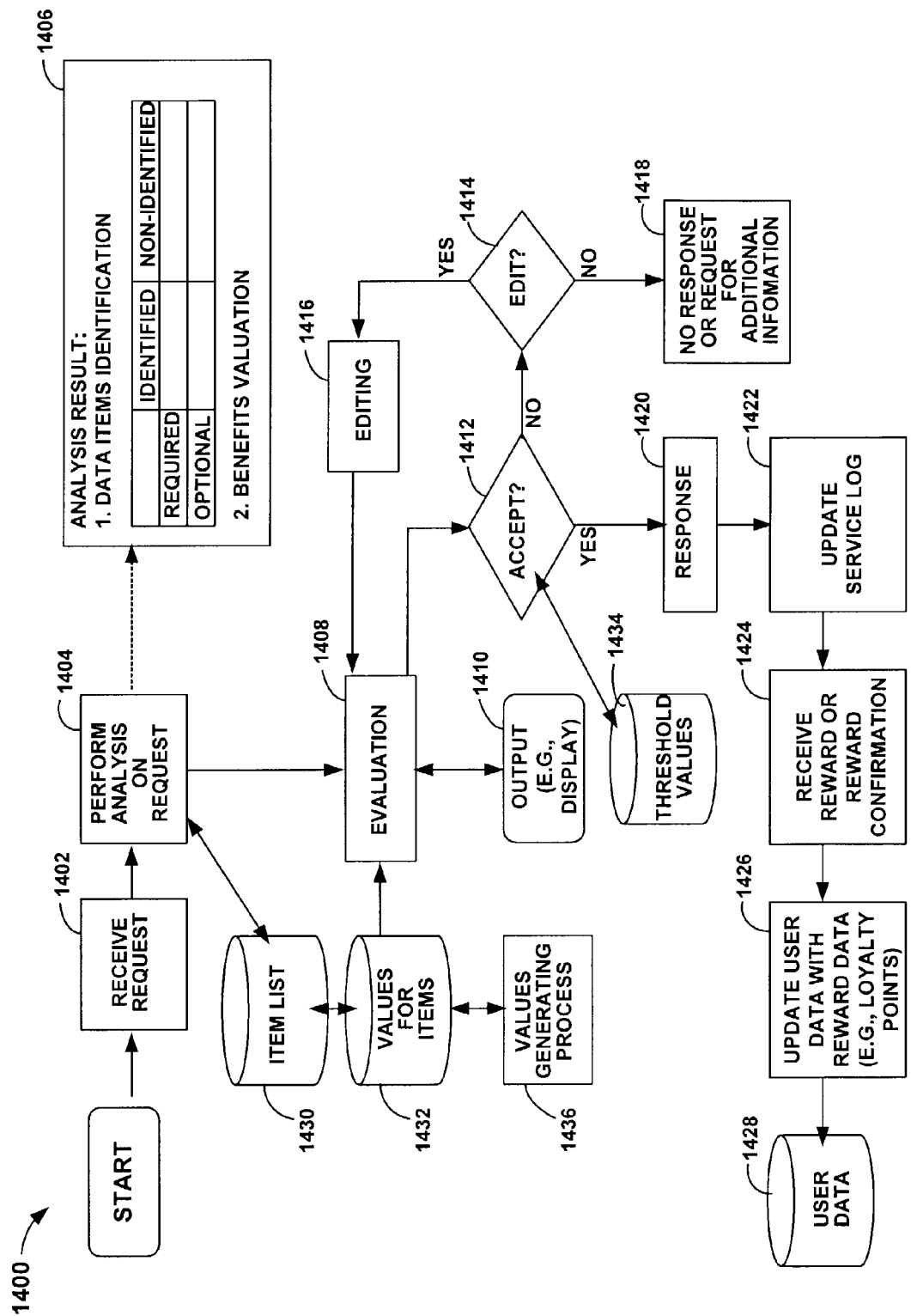
FIG. 14 illustrates an exemplary process by which the provision of requested user data is controlled.

FIG. 14 illustrates a more detailed flow diagram of an exemplary process 1400 by which a request for user information may be evaluated to ascertain a privacy indication or reward indication. The process will be discussed generally with reference to user device 102 and requester 104 of FIG. 1. However, the various processes discussed herein as being performed by the user device may also be distributed to or involve another system, such as trusted party 106.

At step 1402, user device 102 receives a request for user information including one or more data items (e.g., name, address, telephone number, etc.) from a requesting party, such as requester 104. At step 1404, user device 102 initiates and performs an analysis of the request. The analysis may involve identification of characteristics of the requested data items, such as whether a requested data item is a required data item, a non-required (optional) data item, an identified data item and/or a non-identified data item. The analysis may also identify the benefits associated with one or more data items or characteristics of the request, such as a context of the request (e.g., the identity of the requesting party, the purpose of the request, the reliability of the requesting party, etc.)

To facilitate such identification, data items and other information may be expressed by using extended markup language (XML), wireless markup languge (WML) or any other markup language or the like which allows for easier identification of the data items themselves as well as their characteristics.

The characteristic of whether a data item is required or not required may be included by requester 104 as part of the request or may be requested by user device 102. These characteristics of the requested data items may be outputted to the user to facilitate selection of desired request data items and evaluation of the request.

As to "identified" or "non-identified" data items, user device 102 may compare the requested data items to known data items maintained in an item list 1430 or the like and determine which requested data items are identified and/or non-identified. The known data items may be identified in a database, such as a data item list. These characteristics of the requested data items may be outputted to the user to assist in the selection and evaluation of the request. In the event that a requested data item is a non-identified data item, user device 102 may automatically or upon a user command request and receive additional information from requester 104 or generally discard or remove those items from the request. User device 102 may also associate non-identified data items to user data, generate a privacy attribute for the non-identified data items such as via generating process 1436, add the non-identified data items item list 1430, and update an attribute data 1432 accordingly. The association of a non-identified data item to user data may be performed by the user or performed automatically, such as by key term searching of user data, which may be outputted to the user for confirmation.

Furthermore, the analysis may also involve the identification and output of benefits valuation of requester 104. For example, requester 104 (or benefit provider 108) may provide user device 102 with benefit information which identifies the types of rewards or benefits. The benefits information may outline different classes of rewards or benefits depending on the user information provided. This may be expressed in a chart or the like showing the rewards or benefits versus data items, particular combination of data items, particular levels of privacy index and so forth. (e.g., 5% Discount on Products from Company X for a privacy indication of 80 or "Medium"; 10% Discount on Products from Company X for a privacy indication of 110 or "High"; etc.).

Accordingly, analysis of the request provides user device 102 or its user with relevant information which may be employed in the selection of requested data items to be evaluated, as discussed below, as well as to obtain additional information from the requesting party.

At step 1408, user device 102 evaluates a privacy indication for the request according to privacy attributes of one or more of the requested data items. The evaluation may involve automatic selection by user device or manual selection by the user of combinations of the requested data items to be evaluated, and then performance of an evaluation for the selected combination of requested data items according to one or more of the privacy attributes of the requested data items or sub-combinations of the requested data items.

As will be described in further detail below by way of examples, the privacy indication may be quantified (e.g., value of 10) or qualified (e.g., LOW, MEDIUM, HIGH or YES, NO) and a data item may have one or more quantified or qualified privacy attributes associated therewith. For instance, a qualified privacy indication may be ascertained according to the number of selected data items or the specific combination of selected data items (e.g., <10 data items is equal to LOW, etc.). A quantified privacy indication may be ascertained by summing or weight summing quantified privacy attributes (e.g., privacy value) of selected data items and/or sub-combinations of selected data items.

The privacy attribute for a data item or sub-combination of data items may further be dependent on various factors, such as a context of the request or other characteristics of the request or requested data items. The context may include, for example, the purpose of the request, the identity of the requester, the reliability of the requester (e.g., reliable or unreliable), or other contextual factors surrounding the communications session with a requesting party.

The purpose of the request may be expressed by way of example as a commercial purpose, an official purpose, general purpose and/or a non-commercial purpose. The identity of the requesting party may be expressed by way of example as a known party, unknown party, an official entity (e.g., a government agency), a friend, a business associate and so forth. The reliability of the requesting party may be expressed by way of example as an unreliable party or a reliable party.

The purpose of the request, identity of the requesting party and/or reliability of the requesting party may be determined based upon information provided by the requesting party or based on prior history of interaction with the requesting party (via service log), or may be manually identified or defined by the user prior to or during evaluation of the request. For example, a data item NAME may have a privacy value of 10 when the requesting party is an official entity and/or the request serves an official purpose. The same data item NAME may have a privacy value of 50 when the requesting party is unknown and/or the request serves a general or unidentifiable purpose.

After an evaluation is performed, the evaluation analysis may be outputted (e.g., visual output, audio output, etc.) to the user at step 1410. For example, the output may identify the combination(s) of selected data items to be evaluated, the corresponding evaluated privacy indication(s), the privacy threshold(s), and other relevant information which may assist the user in deciding whether to provide data items to a requesting party or generally understanding the nature of the data transaction. A few detailed examples of such outputs have been described above with reference to FIGS. 6–8.

The output of the evaluation analysis as well as any other analyses (e.g., acceptance analysis discussed below) may be triggered or conditioned according to the evaluated privacy indication.

The process continues at step 1412 in which user device 102 determines whether the evaluated privacy indication is acceptable or unacceptable. That is, a determination is made on whether to provide data items of user information according to the evaluated privacy indication. Such a determination may involve accessing a privacy threshold database 1434 and comparing the evaluated privacy indication with predetermined privacy threshold(s). The acceptance may be dependent on the stored threshold attributes for single items, for combination(s) of items, or for the total evaluated value, or the threshold values are given independently on each request.

If the evaluated privacy indication satisfies the privacy threshold (e.g., privacy indication<50 or LOW), then the process proceeds to step 1420 in which user device responds to the request with the combination of selected data items. At step 1422, user device 102 updates a service log with information concerning the data transaction, e.g., data items provided, the identity of the requesting party, purpose of the request, evaluated privacy indication, privacy threshold, time and date of the transaction, and so forth.

At step 1424, user device 102 receives a reward or benefit which may be dependent on the data items provided or a notification of such reward or benefit to be retrieved. At step 1426, user device 102 updates user data, e.g., user data database 1428, with the reward or benefit data (e.g., loyalty points, coupons, etc.). The rewards or benefits may be stored for future or immediate use. When using the rewards or benefits, user device 102 may verify possession of a reward or benefit and conduct a transaction to redeem the reward or benefit, e.g., to forward such benefit or reward to the party which accepts the reward or benefit. The rewards or benefits may be redeemed via an electronic transaction, such as via requester 104 or benefit provider 108, or may be redeemed in-person, such as with a confirmation code or printed coupon.

Returning to step 1412, in the event that the evaluated privacy indication is determined to be unacceptable (e.g., privacy indication>100 or HIGH), such as automatically or by the user, or the user would like to obtain a privacy indication for other combinations, the process proceeds to step 1414 in which a determination is made whether to edit the current combination of selected, requested data items. Such a determination may involve a request to the user to edit or not edit and, accordingly, a user command corresponding to whether to edit or not edit. Alternatively, user device 102 may perform this automatically according to user settings, e.g., EDIT ON or EDIT OFF or upon some predetermined triggering event. For instance, editing is performed if the privacy indication is within a particular threshold (e.g., range of 50<privacy indication<100) or editing is not performed if the privacy indication is within another particular threshold (e.g., privacy indication>150).

If the determination is not to edit the current combination of data items for further evaluation, then the process proceeds to step 1418 in which user device 102 may either provide no response to the request or request additional information, such as benefits information, context information or other information to assist the user in making an informed decision. The additional information to be requested may generally be information which would allow the user or user's device to better assess whether to provide one or more of the requested data items.

If the determination is to edit the current combination of data items, then the process proceeds to step 1416 in which the combination of data items may be edited, e.g., add or remove data items from the combination to form a new combination to be evaluated. The editing may be performed by the user. For instance, the user may be provided an interface to perform such editing manually, an example of which is shown by FIG. 6. Alternatively, user device 102 may perform the editing automatically by selecting a new combination(s) of data items, such as a combination which would satisfy the current privacy threshold settings. In any event, the process then returns to step 1408 for an evaluation of privacy indication for the new combination of data items and a determination of whether the privacy indication is acceptable at step 1412, as discussed above.

Figure 15:
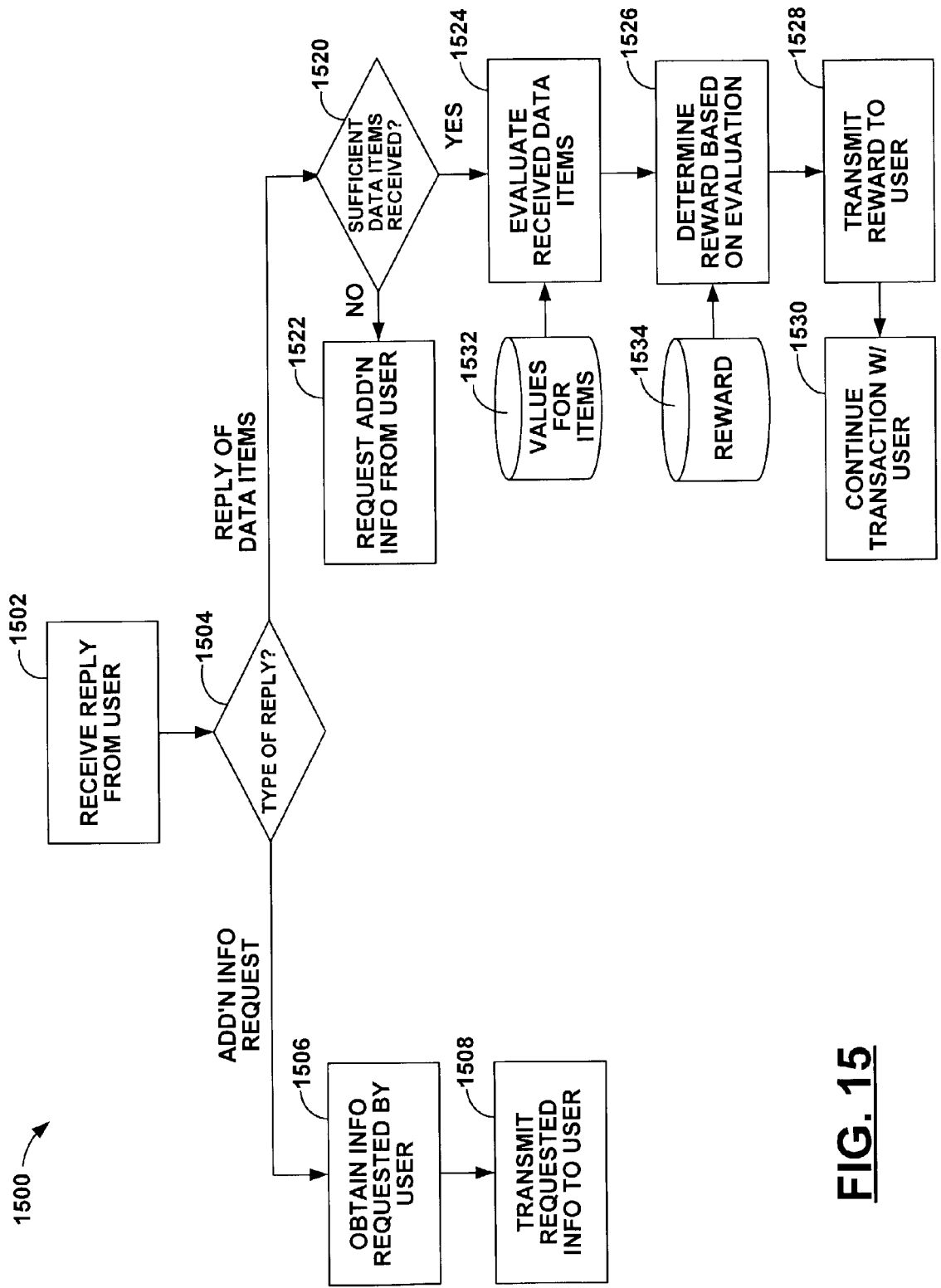
FIG. 15 illustrates an exemplary process by which the requester evaluates data items and provides benefits accordingly.

FIG. 15 illustrates a flow diagram of one or more exemplary processes 1500 performed by a requesting party and/or benefit provider. For the purpose of simplicity, the process will be discussed with reference to FIG. 1 as operations performed by requester 104 even though one or more of the operations may be performed by or in conjunction with another system, such as benefit provider 108.

At step 1502, requester 104 receives a reply or communication from a device, such as user device 102 (or trusted party 106). At step 1504, requester 104 determines whether the reply is a request for additional information or a reply of requested data items.

If the reply is for additional information, such as benefit information or other information related to non-identified data items, then the process proceeds to step 1506 in which requester 104 obtains the additional information. At step 1508, requester 104 then transmits the additional information requested by user device 102. Alternatively, requester 104 may elect not to respond to the request or may also request additional information from user device.

If the reply contains one or more of the requested data items, then the process proceeds to step 1520 in which requester 104 determines whether sufficient data items have been received. For instance, requester 104 may deem the received data items to be insufficient, generally in number of data items or in lacking one or more required data items. If the reply is insufficient, requester 104 may request additional information, such as the deficient data items (e.g., required data items) from user device 102 at step 1522.

Otherwise, if the reply is sufficient, the process proceeds to step 1524 in which requester 104 evaluates a reward (or benefit) indication for the received data items. This evaluation may involve accessing reward or benefit attributes for one or more of the received data items maintained in a attribute database 1532, and may be performed in a similar manner as discussed above for the privacy indication.

At step 1526, requester 104 determines a reward or benefit based on the evaluated reward or benefit indication. This determination may involve accessing a reward (or benefit) database 1534 and comparing the evaluated reward indication to reward threshold(s). Likewise, this determination may be performed in a similar fashion as discussed above for determining whether a privacy indication is acceptable. The reward indication may also be the evaluated privacy indication by user device 102 or trusted party 106. Further, the reward indication may simply coincide with identification of receipt of particular desirable data item(s) (e.g., social security number) or combination of data items (e.g., name, address and telephone number), and may be a qualified indication such as YES or NO or some indication identifying a level of reward (e.g., REWARD 1, REWARD 2, etc.).

The reward or benefit provided may be linear or non-linear to the evaluated reward indication. Such rewards or benefits may include discount on product or services, free product or services, loyalty points or the like, and so forth.

At step 1528, requester 104 transmits the reward or benefit (e.g., coupons, loyalty points, etc.) or confirmation of such reward or benefit to be retrieved to user device 102. At step 1530, the communication session or transaction between user device 102 and requester 104 may thereafter be continued or terminated.

FIG. 16 illustrates a flow diagram of an exemplary process 1600 by which privacy attribute(s) for a new data item or known data item may be added or updated. For the purpose of simplicity, the process will be discussed with reference to FIG. 1 as operations performed by user device 102.

The process is initiated at step 1602 in which generation or update of data items or combination of data items is initiated upon a user command or automatically upon a triggering event. Such triggering event may be periodic, upon a schedule, or in response to identification of a non-identified, requested data item. At step 1602, user device determines the current device setting, such as automatic, default or manual.

In the manual setting, the process proceeds to step 1610 in which the user is requested to provide a privacy attribute (e.g., value or the like). At step 1612, a determination is made whether the provided attribute is acceptable. This may involve checking to ascertain whether the attribute is a valid attribute, e.g., a valid value or valid privacy level (e.g., LOW). The acceptability of the attribute may also involve a user acceptance confirmation. If the attribute is unacceptable, then the process may return to step 1610 requesting the user to provide another privacy attribute.

If the privacy attribute is acceptable, then user device 102 updates privacy attribute database 1640 with the new privacy attribute. While the process describes update of a single privacy attribute, the process may be implemented to add and modify more than one privacy attribute for a data item or combination of data items. As discussed herein, different privacy attributes may be employed for a data item or combination of data items depending on various factors, such as a context of a data request. Likewise, one or more privacy attributes may also be removed as desired.

In the default setting, user device 102 gives the privacy attribute(s) of a data item or combination of data items a default attribute (e.g., predetermined value or privacy level). For instance, a new data item may be given a default attribute of 10 or LOW. Since there may be more than one privacy attribute for a given data item or combination of data items, a new data item or combination of data items may be given plural default privacy attributes for different contexts. These default values may be standard values or common values employed by other users or of a trusted party, such as trusted party 106, and may be updated from the trusted party.

In the automatic setting, user device 102 may automatically generate privacy attribute(s) for a data item or combination of data items according to related statistical data, such as official statistical data at step 1630. Statistical data may be maintained in a statistical database 1650 which may be accessed accordingly and, likewise, updated in a step 1660 in which user device 102 acquires and/or updates statistical information, such as from an Official Web Site or Official facility. Such statistical data may include demographic or other data as to names, age of people, nationality, origin, income, etc. in a particular region (e.g., country, state, city, street, etc.). This information may be analyzed to ascertain the likelihood in identifying the user based on a particular data item, e.g., name, or combination of data items, e.g., name and address.

For example, in the case where the user is John Smith who lives in New York City on 51$^{st}$ Street, statistical information can be obtained to identify how many people with the name John Smith live in New York City or on 51$^{st}$ Street. A corresponding attribute for the data item NAME or combination of data items NAME and ADDRESS may be defined according to the amount of people sharing the same name and location. For instance, if the number of people with the name John Smith living in New York City is greater than 10,000 then a privacy attribute may be a value 10 or LOW or if the number is less than 50 then the privacy attribute may be a value 50 or HIGH.

Once a value is generated, user device 102 updates the privacy attribute(s) for a data item or combination of data items in privacy attributes database 1640. The update and storage may be performed automatically or may require confirmation from the user prior to performing such update and storage.

The generation or update of privacy attributes maybe performed by user device 102 or in conjunction with or by another system(s), such as trusted party 106. The generation and update processes may also similarly be employed to generate and update privacy thresholds or the like.

FIG. 17 illustrates a flow diagram of a process 1700 by which data items are provided according to benefit information.

At step 1702, user device 102 receives a request for data items of user information and benefit information. At step 1704, user device 102 evaluates and ascertains combination(s) of data items based on benefit information and privacy attributes of one or more of the data items from privacy attributes database 1720. For example, a max/min algorithms may be performed to ascertain one or more combinations of data items in which the privacy indication is minimized while maximizing benefits or rewards. The combinations may also take into account whether a data item is required or not required, e.g., by filtering out combinations in which required items are missing. Likewise, other filtering may be employed to limit the number of potential combinations, such as filtering combinations including non-identified data items.

At step 1706, a determination is made as to whether the privacy indication is acceptable according to predetermined privacy threshold(s). If not acceptable, the process may proceed to step 1708 in which the combination of data items may be modified and re-evaluated or, alternatively, the process may be terminated. Otherwise, if acceptable, the acceptable combination of data items is provided to the requesting party.

Various examples of privacy indication or indicator evaluation and determination are discussed below in the Examples 1 through 3.

EXAMPLE #1

In one example, data items and sub-combinations of data items may have associated therewith one or more privacy attributes. These privacy attributes may take the form of a privacy value, e.g., 10, 20, 100, etc. The privacy indication or indictor (PI) may be determined based on summing, such as with the following expression:

$$PI = \sum_{i=1}^{n} p_i \qquad <1>$$

where:

PI is the privacy indication or indicator;

n is the number of data items involved in the evaluation (e.g., selected data items); and $p_i$ is the privacy value for the i-th data item where i=1 . . . n.

In other words, the privacy indication (PI) may be the sum of the privacy values of the data items. For example, data items NAME and ADDRESS may have privacy values 20 and 10, respectively. The privacy indication for the combination of data items NAME and ADDRESS would be 30, e.g., 20+10.

A simplified approach particularly if qualified privacy indication is desired is simply to set each privacy value $p_i$=1 so that PI would simply be the number of data items. If desired, the quantified PI may be expressed as a qualified PI based on the number of data items. For example, PI<5 is LOW (e.g., a low privacy concern) and PI>15 is HIGH (e.g., a high privacy concern). Any quantifiable PI may be converted to a qualified PI in a similar fashion.

However, in some circumstances, data items alone may not create a substantial privacy concern but when combined create a heightened concern over user privacy. To address this issue, one or more sub-combinations of data items may also have privacy attributes associated therewith. For example, the sub-combination of data items NAME and ADDRESS may have an added privacy value of 10. Accordingly, the privacy indication for the combination of data items NAME and ADDRESS would be 40, E.G., 20+10+10. Such an evaluation may be expressed as follows:

$$PI = \sum_{i=1}^{n} p_i + \sum_{j=1}^{k} p_j \qquad <2>$$

where:

k is the number sub-combinations of data items involved in the evaluation; and $p_j$ is the privacy value for the j-th sub-combination of data items where j=1 . . . k.

An example of such an evaluation employing summing is described above with reference to FIG. 6.

While the above describes an examples of evaluating privacy indication, these evaluation techniques may also be employed to evaluate and determine a reward or benefit indication.

EXAMPLE #2

In another example, data items and sub-combinations of data items may have associated therewith one or more privacy attributes and weight factors. These privacy attributes may take the form of a privacy value, e.g., 10, 20, 100, etc. A weight factor may be employed to reflect various factors which may impact user privacy, such as the context of the request. For instance, a different weight may be applied to different data items according to the purpose of the request, the identity of the requesting party or other factors surrounding the request. These weight factors may also be stored along with the privacy attributes for data items and combinations of data items, as desired.

As one example, a weight factor of 1.5 may be applied for unknown requesting party and/or a general purpose, a weight factor of 1.0 may be applied for known, business entity and/or a commercial purpose, and a weight factor of 0.5 may be applied for a friend, official entity and/or an official purpose.

The privacy indication or indictor (PI) may be determined based on weighted summing, such as with the following expression:

$$PI = \sum_{i=1}^{n}((w_i)(p_i)) \quad <3>$$

where:

PI is the privacy indication or indicator;

n is the number of data items involved in the evaluation (e.g., selected data items);

$p_i$ is the privacy value for the i-th data item where i=1 . . . n; and $w_i$ is the weight factor for the i-th data item where i=1 . . . n.

In other words, the privacy indication (PI) may be the sum of the privacy value multiplied by a weight factor for each data item.

As discussed above, sub-combinations of data items may also have associated therewith privacy attributes. Thus, these sub-combinations may also have weight factors associated with them. To address this issue, equation <3> may be modified as follows:

$$PI = \sum_{i=1}^{n}((w_i)(p_i)) + \sum_{j=1}^{k}((w_j)(p_j)) \quad <4>$$

where:

k is the number sub-combinations of data items involved in the evaluation; and $p_j$ is the privacy value for the j-th sub-combination of data items where j=1 . . . k.

$w_j$ is the weight factor for the j-th sub-combination of data items where j=1 . . . n.

Instead of or in addition to employing weight factors on individual items, the evaluated result itself may have a weight applied thereto, which can be expressed as follows:

$$PI = (w_{TOTAL})\sum_{i=1}^{n} p_i \quad <5>$$

where:

$w_{TOTAL}$ is a weight factor applied to the sum of the privacy values.

This weight factor ($w_{TOTAL}$) may also be employed to reflect various factors which may impact user privacy, such as the context of the request. The other equations <2> through <4> may be modified in a similar fashion to incorporate such weight factoring.

EXAMPLE #3

In a further example, data items and sub-combinations of data items may have associated therewith one or more qualified privacy attributes. A privacy indication may be evaluated using various algorithms or techniques assessing such qualified attributes. For instance, the privacy indication may be the highest privacy level of a data item in a set of data items. That is, if data item A and data item B have attributes LOW and MEDIUM, the resulting privacy indication would be MEDIUM. However, as discussed above, sub-combinations may also implicate higher privacy concerns. The combination of data items A and B may have an attribute of HIGH. Accordingly, the resulting privacy indication would be HIGH.

Other techniques may also be employed to evaluate qualified attributes to reflect different privacy levels implicated by provision of different combinations of data items. Further, the privacy attributes and/or privacy indications may be classified in a different form, such as LEVEL 1, LEVEL 2, or YES, NO, or RESTRICTED, UNRESTRICTED, etc.

The implementation of the system may also be performed with or without direct user input or intervention, such as automatically, semi-automatically or manually. An example 4 is provided below showing how user device 102 and/or trusted party 106 may be configured to perform in such modes of operation according to the evaluation result.

While the above describes examples of evaluating privacy indication, these evaluation techniques, as in examples 1 through 3, may also be employed to evaluate and determine a reward or benefit indication.

EXAMPLE #4

In this example, various threshold levels are employed to ascertain whether to respond to a requesting party automatically without user input or with user input. Depending on the evaluated privacy indication, user device 102 and/or trusted party 106 may provide the user with the ability to edit data items to be evaluated, or to provide some or all or none of the requested data items.

For example, a response to a request can be given automatically if the evaluated privacy index is within prescribed limits. Such limits may further be dependent on various factors, such as the requesting party, and/or on the purpose of the request, and/or the reliability of the requester.

In one example, user device 102 and/or trusted party 106 may be configured (1) to provide data items to a requesting party without outputting an evaluation analyses or automatically if the evaluated privacy indication satisfies a first threshold (e.g., privacy indication<50 or LOW); to output the privacy indication along with other relevant information associated with the evaluation if the evaluated privacy indication satisfies a second threshold (e.g., 50<privacy indication<100 or privacy=MEDIUM) and to allow the user to determine whether to provide data items to the requesting party; or (3) to output the privacy indication or the like with other relevant information associated with the evaluation if the evaluated privacy indication satisfies a third threshold (e.g., privacy indication>100 or privacy indication=HIGH) and to allow the user to modify or edit the combination of data items for further evaluation or provide none of the requested data items.

This example is simply provided to show that various processes involved in the provision of user information may be performed automatically or semi-automatically or manually via user device 102 and/or trusted party 106, as desired.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
   evaluating a privacy indication of a request for one or more data items of user information by a requesting party based on at least one privacy attribute of one or more of the requested data items, the evaluating operation being performed by user's device; and
   providing to the requesting party one or more of the requested data items according to the evaluated privacy indication.

2. The method according to claim 1, further comprising:
   receiving a request for one or more data items of user information from the requesting party.

3. The method according to claim 1, further comprising:
   identifying one or more characteristics of one or more of the requested data items.

4. The method according to claim 1, further comprising:
   analyzing whether one or more of the requested data items are identified data items or non-identified data items; and
   requesting information from the requesting party for at least one non-identified data items.

5. The method according to claim 4, further comprising:
   defining one or more privacy attributes for a non-identified data item.

6. The method according to claim 4, further comprising:
   maintaining a database of identified data items of user information.

7. The method according to claim 6, further comprising:
   updating the database of identified data items with a non-identified, requested data item.

8. The method according to claim 1, wherein the requested data items include required data items and non-required data items.

9. The method according to claim 8, further comprising:
   informing a user of whether a requested data item is a required data item or a non-required data item.

10. The method according to claim 8, further comprising:
    receiving notification from the requesting party requesting provision of one or more required data items which have not been received by the requesting party.

11. The method according to claim 1, further comprising:
    selecting one or more of the requested data items;
    evaluating a privacy indication for a combination of the selected data items; and
    providing to the requesting party the combination of the selected data items according to the evaluated privacy indication.

12. The method according to claim 11, further comprising:
    analyzing the request for data items to ascertain a characteristic for one or more of the requested data items prior to selection, the characteristic including at least one of being a required data item, a non-required data item, an identified data item, and a non-identified data item.

13. The method according to claim 12, further comprising:
    informing a user of the characteristic for one or more of the requested data items.

14. The method according to claim 12, wherein at least the required, requested data items are automatically selected.

15. The method according to claim 11, wherein the combination of the selected data items are provided to the requesting party if the evaluated privacy indication satisfies a predetermined privacy threshold.

16. The method according to claim 11, further comprising:
    informing a user of the combination of the selected data items if the evaluated privacy indication satisfies at least one of predetermined notification threshold and predetermined notification range.

17. The method according to claim 16, wherein the combination of the selected data items to the requesting party is provided to the requesting party subsequent to the informing operation upon a user command.

18. The method according to claim 16, further comprising:
    allowing a user to edit the combination of the selected data items to form a new combination of data items;
    evaluating a privacy indication for the edited combination; and
    providing the edited combination of data items to the requesting party if the privacy indication satisfies the predetermined privacy threshold.

19. The method according to claim 11, wherein the selecting operation is performed by a user.

20. The method according to claim 11, further comprising:
    obtaining quantified privacy attributes for the selected data items or sub-combinations of the selected data items; and
    summing the quantified privacy attributes to determine the privacy indication for the combination of selected data items.

21. The method according to claim 20, wherein a data item or sub-combination of data items has associated therewith one or more privacy attributes.

22. The method according to claim 21, wherein the privacy attribute of a data item or sub-combination of data items vary according to a context in which the user information is requested.

23. The method according to claim 22, wherein the context comprises at least one of a purpose of a request for user information and an identity of the requesting party.

24. The method according to claim 23, wherein the purpose of a request includes at least one of a commercial purpose, an official purpose and a non-commercial purpose.

25. The method according to claim 23, wherein the identity includes at least one of known party, unknown party, a friend, a business acquaintance and an official entity.

26. The method according to claim 20, further comprising:
applying a weight factor to a quantified privacy attribute of a selected data item prior to the summing operation.

27. The method according to claim 26, wherein the weight factor reflects a context in which the user information is requested.

28. The method according to claim 27, wherein the context comprises at least one of a purpose of a request for user information and an identity of the requesting party.

29. The method according to claim 20, further comprising:
applying a weight factor to the summed privacy indication.

30. The method according to claim 29, wherein the weight factor reflects a context in which the user information is requested.

31. The method according to claim 30, wherein the context comprises at least one of a purpose of a request for user information and an identity of the requesting party.

32. The method according to claim 20, wherein the privacy indication reflects a number of the selected data items.

33. The method according to claim 1, further comprising:
defining one or more privacy attributes for a data item or combination of data items.

34. The method according to claim 33, wherein the one or more privacy attributes are defined by the user.

35. The method according to claim 33, wherein the one or more privacy attributes are defined by a trusted party.

36. The method according to claim 33, wherein the one or more privacy attributes are defined according to statistical data relating to the data item or the combination of data items.

37. The method according to claim 33, wherein the one or more privacy attributes are defined with a default parameter.

38. The method according to claim 1, wherein the one or more privacy attributes of one or more data items are standard attributes.

39. The method according to claim 1, wherein the evaluating evaluates a privacy indication for different combinations of the request data items and the providing provides a selected combination of the request data items from the different combination according to the evaluated privacy indications.

40. The method according to claim 1, wherein the privacy indication is quantified privacy indication.

41. The method according to claim 40, wherein that the quantified privacy indication represents a level of privacy.

42. The method according to claim 41, wherein the level of privacy comprises one of low, medium and high.

43. A method comprising:
evaluating a privacy indication of a request for one or more data items of user information by a requesting party based on at least one privacy attribute of one or more of the requested data items; and
providing to the requesting party one or more of the requested data items according to the evaluated privacy indication,
wherein the requesting party is provided with one or more of the requested data items if the evaluated privacy indication satisfies a predetermined privacy threshold.

44. The method according to claim 43, wherein the predetermined privacy threshold varies according to a context of the request from the requesting party.

45. The method according to claim 44, wherein the context comprises at least one of a purpose of a request for user information and an identity of the requesting party.

46. The method according to claim 45, wherein the purpose of a request includes at least one of a commercial purpose, an official purpose and a non-commercial purpose.

47. The method according to claim 45, wherein the identity includes at least one of known party, unknown party, a friend, a business associate and official entity.

48. A method comprising:
evaluating a privacy indication of a request for one or more data items of user information by a requesting party based on at least one privacy attribute of one or more of the requested data items; and
providing to the requesting party one or more of the requested data items according to the evaluated privacy indication,
wherein the evaluating operation and the providing operation are distributed between a user's device and a trusted party.

49. A method comprising:
receiving user information including one or more requested data items associated with a transaction with a user;
evaluating a reward indication for the received user information based on at least one reward attribute of one or more of the requested data items; and
providing a reward to a user according to the evaluated reward indication, the reward being a benefit to a user separate from the underlying transaction.

50. A communications device comprising:
communications hardware for communicating with one or more parties across a network environment; and
a processing system to evaluate a privacy indication of a request for one or more data items of user information by a requesting party based on at least one privacy attribute of one or more of the requested data items, and to provide to the requesting party one or more of the requested data items according to the evaluated privacy indication,
wherein the evaluating operation is performed by a user's device.

51. A distributed networked system including a communications device operated by a user and a networked server configured to cooperate together to perform the following operations:
evaluating a privacy indication of a request for one or more data items of user information by a requesting party based on at least one privacy attribute of one or more of the requested data items, the evaluating operation being performed by a user's device; and
providing the requesting party with one or more of the requested data items according to the evaluated privacy indication.

52. A system comprising:
communications hardware for conducting communications with one or more parties across a network environment;

a processing system to receive user information including one or more of the requested data items associated with a transaction with a user; to evaluate a reward indication for the received user information based on at least one reward attribute of one or more of the requested data items; and to provide a reward to the user according to the evaluated reward indication, the reward being a benefit to user separate from the underlying transaction.

53. A distributed networked system including a requester system and a networked server configured to cooperate together to perform the following operations:

receiving user information including one or more of the requested data items associated with a transaction with a user;

evaluating a reward indication for received user information based on at least one reward attribute of one or more of the requested data items; and providing a reward to a user according to the evaluated reward indication, the reward being a benefit to user separate from the underlying transaction.

54. A computer-readable medium encoded with processing instructions for implementing a method of managing user privacy of user data, the method comprising:

evaluating a privacy indication of a request for one or more data items of user information by a requesting party based on at least one privacy attribute of one or more of the requested data items, the evaluating operation being performed by user's device; and providing to the requesting party one or more of the requested data items according to the evaluated privacy indication.

55. A computer-readable medium encoded with processing instructions for implementing a method of rewarding a user, the method comprising:

receiving user information including one or more of the requested data items associated with a transaction with a user;

evaluating a reward indication for received user information based on at least one reward attribute of one or more of the requested data items; and providing a reward to a user according to the evaluated reward indication, the reward being a benefit to user separate from the underlying transaction.

* * * * *